United States Patent
Shinohara et al.

(10) Patent No.: US 9,250,704 B2
(45) Date of Patent: Feb. 2, 2016

(54) INFORMATION PROCESSING DEVICE AND INFORMATION PROCESSING METHOD

(75) Inventors: Takayuki Shinohara, Tokyo (JP); Hidehiko Morisada, Tokyo (JP); Yute Lin, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 867 days.

(21) Appl. No.: 13/255,351

(22) PCT Filed: Dec. 18, 2009

(86) PCT No.: PCT/JP2009/007037
§ 371 (c)(1),
(2), (4) Date: Nov. 17, 2011

(87) PCT Pub. No.: WO2010/109570
PCT Pub. Date: Sep. 30, 2010

(65) Prior Publication Data
US 2012/0056903 A1    Mar. 8, 2012

(30) Foreign Application Priority Data

Mar. 25, 2009 (JP) ................................ 2009-075242
Mar. 25, 2009 (JP) ................................ 2009-075243
Mar. 25, 2009 (JP) ................................ 2009-075244
Mar. 25, 2009 (JP) ................................ 2009-075267

(51) Int. Cl.
*G06F 3/01* (2006.01)
*H04N 1/393* (2006.01)

(52) U.S. Cl.
CPC .............. *G06F 3/013* (2013.01); *H04N 1/3935* (2013.01); *G09G 2340/04* (2013.01)

(58) Field of Classification Search
CPC ................... H04N 1/3935; G06T 2207/20016; G09G 2340/0407; G09G 2340/04
USPC .......................... 345/428, 698; 382/289–290; 715/781–794, 853
See application file for complete search history.

(56) References Cited

U.S. PATENT DOCUMENTS 5,977,996 A    11/1999  Kondo
6,072,478 A    6/2000  Kurihara
(Continued)

FOREIGN PATENT DOCUMENTS

CN    1208195 A    2/1999
JP    2000235385 A    8/2000
(Continued)

OTHER PUBLICATIONS

Office Action issued for corresponding Canadian Patent Application No. 2,754,672, dated Nov. 28, 2014.*
(Continued)

*Primary Examiner* — Matthew D Salvucci
(74) *Attorney, Agent, or Firm* — Matthew B. Dernier, Esq

(57) ABSTRACT

First a standard image to which a link is defined is displayed. If a user operates a input device and if the viewpoint enters into the first link boundary, and if the information indicating that a resume operation is required does not exist the first frame of moving image data is read out and displayed on the display device as a still image. If the viewpoint enters into the second link boundary, playing back and displaying of the moving image and is started. If the viewpoint moves out from the second link boundary, a frame displayed when the playback of the moving image is suspended is displayed as a still image and the resume point is stored. If the viewpoint moves out of the first link boundary, a standard image is displayed.

13 Claims, 22 Drawing Sheets

(56) References Cited

U.S. PATENT DOCUMENTS

| | | | |
|---|---|---|---|
| 6,400,364 B1* | 6/2002 | Akisada et al. | 345/427 |
| 6,563,999 B1 | 5/2003 | Suzuoki | |
| 6,650,343 B1 | 11/2003 | Fujita | |
| 6,744,934 B2 | 6/2004 | Yoda | |
| 2003/0179231 A1 | 9/2003 | Fujita | |
| 2006/0028473 A1* | 2/2006 | Uyttendaele et al. | 345/473 |
| 2006/0140494 A1* | 6/2006 | Ishikawa | 382/239 |

FOREIGN PATENT DOCUMENTS

| | | |
|---|---|---|
| JP | 2008257555 A | 10/2008 |
| WO | 2008126739 A1 | 10/2008 |

OTHER PUBLICATIONS

Office Action issued for corresponding Japanese Patent Application No. 2009-075242, dated Feb. 26, 2013.
Office Action issued for corresponding Japanese Patent Application No. 2009-075243, dated Feb. 26, 2013.
Office Action issued for corresponding Japanese Patent Application No. 2009-075244, dated Feb. 26, 2013.
Office Action issued for corresponding Japanese Patent Application No. 2009-075267, dated Feb. 26, 2013.
Office Action issued for corresponding Chinese Application No. 200980158283.X, dated Mar. 19, 2013.
Office Action issued for corresponding Korean Application No. 10-2011-7024890, Apr. 1, 2013.
Office Action issued for corresponding Australian Patent Application No. 2009343075, dated May 13, 2013.
Office Action issued for corresponding Canadian Patent Application No. 2,754,672, dated Sep. 18, 2013.
International Search Report for corresponding application PCT/JP2009/007037, May 18, 2010.
International Preliminary Report on Patentability for corresponding application PCT/JP2009/007037, Oct. 18, 2011.

* cited by examiner

FIG.12

```
<?xml version="1.0" encoding="utf-8"?>                                                          (1)
<gigantic_image version="1.0">                                                                  (2)
        <!-- HOME POSITION -->                                                                  (3)
        <home>                                                                                  (4)
                <view zoom="0.85"/>                                                             (5)
        </home>                                                                                 (6)
                                                                                                (7)
        <!-- RANGE WHERE FREE MOVEMENT IS ALLOWED -->                                           (8)
        <limit>                                                                                 (9)
                <boundary max_stretch="2.0" min_zoom="0.85" max_overshoot="0.5"/>              (10)
        </limit>                                                                               (11)
                                                                                               (12)
        <!-- LINK DESTINATION HIERARCHICAL DATA -->                                            (13)
        <link target="a.xml" direction="forward"                                               (14)
                center_x="1100.0" center_y="600.0" width="2000.0" height="1000.0">             (15)
                <boundary action="jump"                                                        (16)
                        scale="1.0" offset_x="0.0" offse_y="0.0" max_overshoot="0.5" min_zoom="0.5"/>  (17)
        </link>                                                                                (18)
                                                                                               (19)
        <!-- EMBEDDING MOVING IMAGE -->                                                        (20)
        <embed source="b.mp4"                                                                  (21)
                center_x="3200.0" center_y="600.0" width="640.0" height="360.0">               (22)
                <boundary action="show" max_overshoot="1.0" max_invisibility="0.6" min_zoom="0.20"/>  (23)
                <boundary action="play" max_overshoot="1.0" max_invisibility="0.6" min_zoom="0.35"/>  (24)
        </embed>                                                                               (25)
                                                                                               (26)
        <!-- EMBEDDING SOUND -->                                                               (27)
        <embed source="c.mp3"                                                                  (28)
                center_x="1100.0" center_y="1700.0" width="2000.0" height="1000.0">            (29)
                <boundary action="play" max_overshoot="0.5" max_invisibility="1.0" min_zoom="0.25"/>  (30)
        </embed>                                                                               (31)
                                                                                               (32)
        <!-- EMBEDDING STORE LINK -->                                                          (33)
        <embed source="store:AAA"                                                              (34)
                center_x="3200.0" center_y="2000.0" width="2000.0" height="400.0">             (35)
                <boundary action="show_link" max_overshoot="0.5" max_invisibility="1.0" min_zoom="1.0"/>  (36)
        </embed>                                                                               (37)
                                                                                               (38)
        <!-- ACKNOWLEDGING SELECTION -->                                                       (39)
        <select>                                                                               (40)
                <boundary max_overshoot="075" max_invisibility="1.0" min_zoom="0.25"/>         (41)
                <option frame_color="#0000ff"                                                  (42)
                        center_x="1100.0" center_y="600.0" width="2000.0" height="1000.0">     (43)
                        <view zoom="1.1" offet_x="0.0" offset_y="0.0"/>                        (44)
                </option>                                                                      (45)
                <option frame_color="#00ff00"                                                  (46)
                        center_x="3200.0" center_y="600.0" width="1800.0" height="900.0">      (47)
                        <view zoom="1.1" offet_x="0.0" offset_y="0.0"/>                        (48)
                </option>                                                                      (49)
                <option frame_color="#ff0000"                                                  (50)
                        center_x="1100.0" center_y="1700.0" width="1800.0" height="900.0">     (51)
                        <view zoom="1.1" offet_x="0.0" offset_y="0.0"/>                        (52)
                </option>                                                                      (53)
                <option frame_color="#ff00ff"                                                  (54)
                        center_x="3200.0" center_y="1700.0" width="1800.0" height="900.0">     (55)
                        <view zoom="1.1" offet_x="0.0" offset_y="0.0"/>                        (56)
                        <select>                                                               (57)
                                <boundary scale="1.0" offet_x="0.0" offset_y="0.0"/>           (58)
                                <option center_x="2400.0" center_y="1700.0"                    (59)
                                        width="400.0" height="400.0">                          (60)
                                <option center_x="2900.0" center_y="1700.0"                    (61)
                                        width="400.0" height="400.0">                          (62)
                                <option center_x="3400.0" center_y="1700.0"                    (63)
                                        width="400.0" height="400.0">                          (64)
                                <option center_x="3900.0" center_y="1700.0"                    (65)
                                        width="400.0" height="400.0">                          (66)
                        </select>                                                              (67)
                </option>                                                                      (68)
        </select>
</gigantic_image>

200
```

INFORMATION PROCESSING DEVICE AND INFORMATION PROCESSING METHOD

TECHNICAL FIELD

The present invention relates to an information processing technology for processing information in accordance with an instruction input by a user in response to a displayed image.

BACKGROUND ART

Home entertainment systems capable of playing back moving images as well as running game programs have been proposed. In home entertainment systems, a GPU generates three-dimensional images using polygons (see, for example, patent document No. 1).

Meanwhile, technology capable of the enlargement or reduction of a displayed image or the movement of the image in the upward, downward, leftward, or rightward directions, is proposed, by using tile images of a plurality of resolutions generated from a digital image such as a high-definition photo. In this image processing technology, the size of an original image is reduced into a plurality of stages to generate images of different resolutions so as to represent the original image in a hierarchical structure, where the image in each layer is divided into one or more tile images. Normally, the image with the lowest resolution is composed of one tile image. The original image with the highest resolution is composed of the largest number of tile images. An image processing device is configured to enlarge or reduce a displayed image such that an enlarged view or reduced view is presented efficiently by switching a currently-used tile image to a tile image of a different layer.

RELATED ART LIST

[patent document 1] U.S. Pat. No. 6,563,999

In recent years, display screens of mobile terminals have been increasing in size, and it has therefore become possible to display high-definition images regardless of the type of information processing device. Thus, people can readily access various types of visually appealing content. As the information to be displayed becomes more complex and advanced, wide-ranging knowledge and complex operation are required in order to take advantage of the information. Therefore, there often exists a trade-off between the quality of information and the ease of operation. The creation of a complex content including images requires additional expertise. In addition, a situation in which users are required to understand a key assignment or required to operate a plurality of keys at the same time imposes a burden on users, especially for those who are not used to the operation of the devices.

SUMMARY OF THE INVENTION

The present invention addresses the aforementioned issue, and a purpose thereof is to provide a technology capable of implementing various processes through easy operation. Another purpose of the present invention is to provide a technology for supporting the operation of the user on display images.

According to an embodiment of the present invention, an information processing device is provided. The information processing device comprises: a storage device configured to store hierarchical data that comprises image data of different resolutions that is hierarchized in order of resolution; an input information acquisition unit configured to acknowledge a user request for movement of a viewpoint in a virtual space which is defined by an image plane and a distance from the image plane; a display image processing unit configured to create a display image from the hierarchical data by changing an area to be displayed in response to the request to move the viewpoint; and an object execution unit configured to execute a process that is associated with a predetermined area of an image, when the view point meets a condition for activating the process, wherein the condition is defined by the positional relationship between the predetermined area defined on the image plane and an area that is determined by the viewpoint and that is displayed on a screen.

According to another embodiment of the present invention, an information processing method is provided. The information processing method comprises: reading from a memory hierarchical data that comprises image data of different resolutions that is hierarchized in order of resolution and outputting the data to a display device; acknowledging a user request for movement of a viewpoint in a virtual space which is defined by an image plane and a distance from the image plane; changing an area to be displayed on the display device in response to the request to move the viewpoint; and executing a process defined as being associated with a predetermined area of an image, when the view point meets a condition for activating the process, wherein the condition is defined by the positional relationship between the predetermined area defined on the image plane and an area that is determined by the viewpoint and that is displayed on a screen.

According to yet another embodiment of the present invention, a data structure for content is provided. The data structure for content is adapted to associate data and a file with each other, wherein the data is hierarchical data that comprises image data of different resolutions that is hierarchized in order of resolution; and wherein the file is a definition file configured to describe a condition for activating a process associated with a predetermined area in an image displayed while using the hierarchical data, the condition being defined by the positional relationship between the predetermined area defined on the plane of the image and an area of the image, the area being displayed on a screen and being determined by a viewpoint in a virtual space which is defined by the image plane and the distance from the image plane.

According to yet another embodiment of the present invention, an information processing device is provided. The information processing device comprises: a storage device configured to store hierarchical data that comprises image data of different resolutions that is hierarchized in order of resolution; an input information acquisition unit configured to acknowledge a user request for movement of a viewpoint in a virtual space which is defined by an image plane and a distance from the image plane; a display image processing unit configured to create a display image from the hierarchical data by changing an area to be displayed in response to the request to move the viewpoint; and an image work unit configured to perform a process on a plurality of areas in the display image so as to display the areas with emphasis, wherein the input information acquisition unit further acknowledges a user instruction for a selection of an area among the plurality of areas displayed with emphasis, and the display image processing unit further changes the area to be displayed in response to the instruction for selection.

According to yet another embodiment of the present invention, an information processing method is provided. The information processing method comprises: reading from a memory hierarchical data that comprises image data of different resolutions that is hierarchized in order of resolution and outputting the data to a display device; acknowledging a user request for movement of a viewpoint in a virtual space which is defined by an image plane and a distance from the image plane; changing an area to be displayed on the display device in response to the request to move the viewpoint; performing a process on a plurality of areas included in the display image so as to display the areas with emphasis; acknowledging a user instruction for a selection of an area of the plurality of areas displayed with emphasis; and further changing the area to be displayed in response to the instruction for selection.

According to yet another embodiment of the present invention, a data structure for content is provided. The data structure for content is adapted to associate with each other hierarchical data and data on a plurality of images, wherein the hierarchical data comprises image data of different resolutions that is hierarchized in order of resolution, and the plurality of images are respectively associated with a plurality of areas to be displayed with emphasis as selection targets in an image that is displayed by using the hierarchical data, and when one of the plurality of areas is selected, an image associated with the selected area is displayed additionally after the display area of the image that is displayed by using the hierarchical data is changed.

According to yet another embodiment of the present invention, an information processing device is provided. The information processing device comprises: a storage device configured to store hierarchical data that comprises image data of different resolutions that is hierarchized in order of resolution; an input information acquisition unit configured to acknowledge, via an input device operated by a user, a request for movement of a viewpoint in a virtual space which is defined by an image plane and a distance from the image plane; and a display image processing unit configured to create a display image from the hierarchical data by changing an area to be displayed in response to the request to move the viewpoint and configured to create from the hierarchical data one reference display image having a resolution lower than that of an image being displayed currently when the user executes a specified operation via the input device, wherein the reference display image is one of a plurality of images of a plurality of areas corresponding to a plurality of viewpoints of which the distances from the image plane are different, and the one reference display image is selected from among the plurality of reference display images depending on the image being displayed currently.

According to yet another embodiment of the present invention, an information processing method is provided. The information processing method comprises: reading from a memory hierarchical data that comprises image data of different resolutions that is hierarchized in order of resolution and outputting the data to a display device; acknowledging, via an input device operated by a user, a request for movement of a viewpoint in a virtual space which is defined by an image plane and a distance from the image plane; changing an area to be displayed on the display device in response to the request to move the viewpoint; and creating from the hierarchical data one reference display image of a resolution lower than that of an image being displayed currently when the user executes a specified operation via the input device, wherein the reference display image is one of a plurality of images of a plurality of areas corresponding to a plurality of viewpoints of which the distances from the image plane are different, and the one reference display image is selected from among the plurality of reference display images depending on the image being displayed currently.

According to yet another embodiment of the present invention, a data structure for content is provided. The data structure for content is adapted to associate with each other hierarchical data and information on image data included in the hierarchical data, wherein the hierarchical data comprises image data having different resolutions that is hierarchized in order of resolution; and the image data is data of a plurality of reference display images of different resolution, one of which is selected, when a user executes a specified operation via an input device while an image created from the hierarchical data is displayed, as a target to be displayed thereafter in accordance with an area of the image being displayed.

According to yet another embodiment of the present invention, an information processing device is provided. The information processing device comprises: a storage device configured to store data of an image including a specified area designating a target to be zoomed in; an input information acquisition unit configured to acknowledge a user request for movement of a viewpoint in a virtual space which is defined by an image plane and a distance from the image plane; a display image processing unit configured to create a display image from the data of the image by changing an area to be displayed in response to the request to move the viewpoint; and a guidance control unit configured to control so as to guide an area displayed on a screen in the direction to the specified area by adding a horizontal planar movement to the viewpoint if the viewpoint meets a guidance condition while the user executes an operation for enlarging an image, the guidance condition being defined by the positional relationship between the specified area and an area that is determined by the viewpoint and that is displayed on a screen.

According to yet another embodiment of the present invention, an information processing method is provided. The information processing method includes: reading data of an image including a specified area designating a target to be zoomed in from a memory and outputting the data to a display device; acknowledging a user request for movement of a viewpoint in a virtual space which is defined by an image plane and a distance from the image plane; changing an area to be displayed on the display device in response to the request to move the viewpoint; and guiding an area displayed on a screen in the direction to the specified area by adding horizontal planar movement to the viewpoint if the viewpoint meets a guidance condition while the user executes an operation for enlarging an image, the guidance condition being defined by the positional relationship between the specified area and an area that is determined by the viewpoint and that is displayed on a screen.

According to yet another embodiment of the present invention, a data structure for content is provided. The data structure for content is adapted to associate data of an image, data on a specified area, and a guidance condition among each other: wherein the specified area is included in the image and designates a target to be zoomed in; and the guidance condition is a condition for adding a horizontal planar movement to a viewpoint in a virtual space in order to guide an area displayed on a screen in the direction to the specified area while the user executes an operation for enlarging an image, wherein the virtual space is defined by an image plane and a distance from the image plane, and the guidance condition is defined by the positional relationship between the specified area and the area displayed on the screen.

Optional combinations of the aforementioned constituting elements, and implementations of the invention in the form of methods, apparatuses, systems, computer programs, and recording media that store computer programs may also be practiced as additional modes of the present invention.

The present invention allows various information processes to be achieved through easy operation.

BRIEF DESCRIPTION OF THE DRAWINGS

FIG. 12 shows an example of a definition file written in XML according to the first embodiment;

DETAILED DESCRIPTION OF THE INVENTION

First Embodiment

Figure 1:
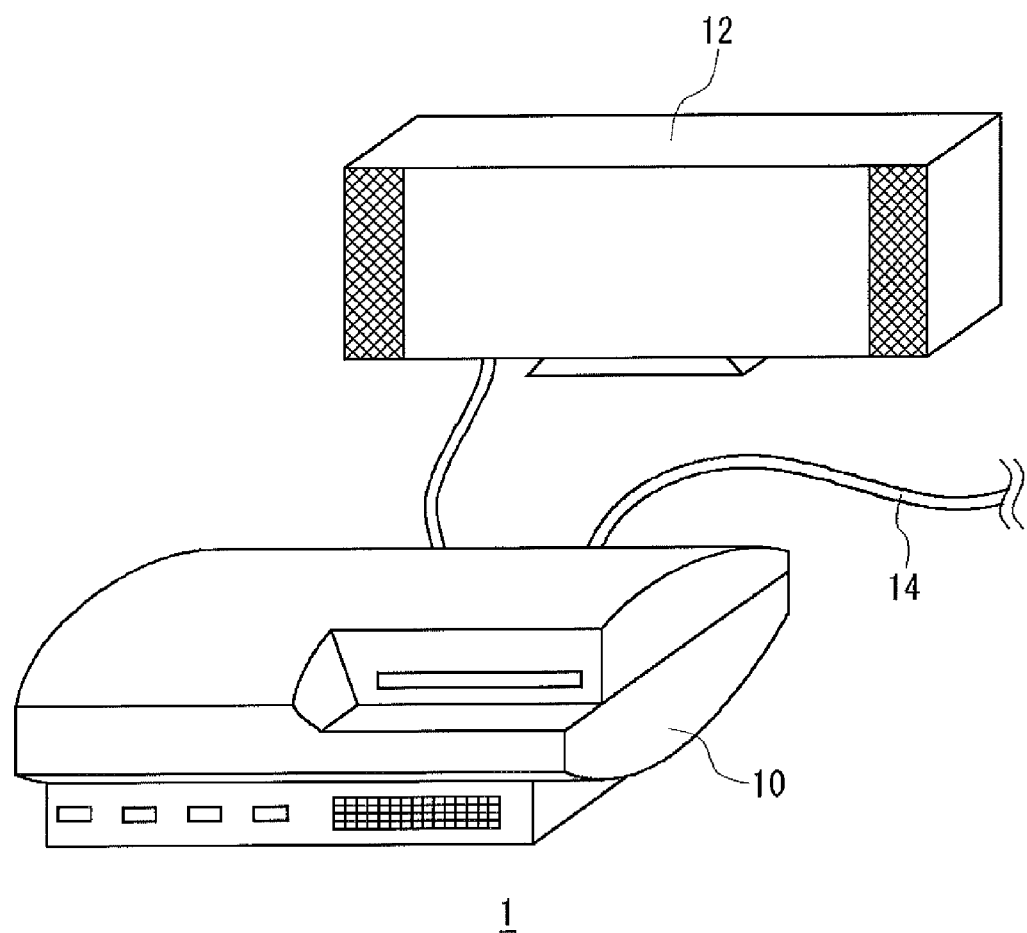
FIG. 1 shows an environment in which an image processing system according to a first embodiment of the present invention is used.

FIG. 1 shows an environment in which an information processing system 1 is used according to an embodiment of the present invention. The information processing system 1 comprises an information processing device 10 and a display device 12. The information processing device 10 is configured to process content that includes at least a function such as image processing, moving image playback, audio playback, communications, or the like. The display device 12 is configured to output the result of the processing performed by the information processing device 10. The display device 12 may be a television set provided with a display for image output and a speaker for audio output. The display device 12 may be connected to the information processing device 10 by cable or wirelessly connected using, for example, a wireless LAN (Local Area Network).

The information processing device 10 in the information processing system 1 may be connected to an external network such as the Internet via a cable 14 and may download and acquire content software including compressed hierarchical image data, or the like. The information processing device 10 may be connected to an external network via wireless communication.

The information processing device 10 may be a game device, a personal computer, or the like, and may achieve a function, which will be described later, by loading software from various recording media. According to the embodiment, images displayed on the display device 12 plays the role of a user interface by using an image processing mechanism, which will be described later. A user inputs an instruction to the information processing device 10 by changing display images while using an input device. Processes performed by the information processing device 10 in response to the inputted instruction may be different for respective content. A specific example will be given later.

As the user inputs, via the input device, a request for enlarging/reducing a display area or the scrolling of the display area in the upward, downward, leftward, or rightward directions while viewing an image displayed on the display device 12, the input device transmits, in response to the user input, a request signal to move, enlarge, or reduce the display image to the information processing device 10. The information processing device 10 changes the image on the screen of the display device 12 in accordance with the signal. Since such movement, enlargement, or reduction of the display image can be construed also as a virtual movement of a viewpoint of the user, hereinafter, these processes will be collectively referred to as a "movement of the viewpoint". The information processing device 10 further performs a process associated with a predefined area in the image in accordance with a predetermined rule. For example, if the user zooms in to the predefined area, the information processing device 10 start an operation that is associated with the area.

Figure 2:
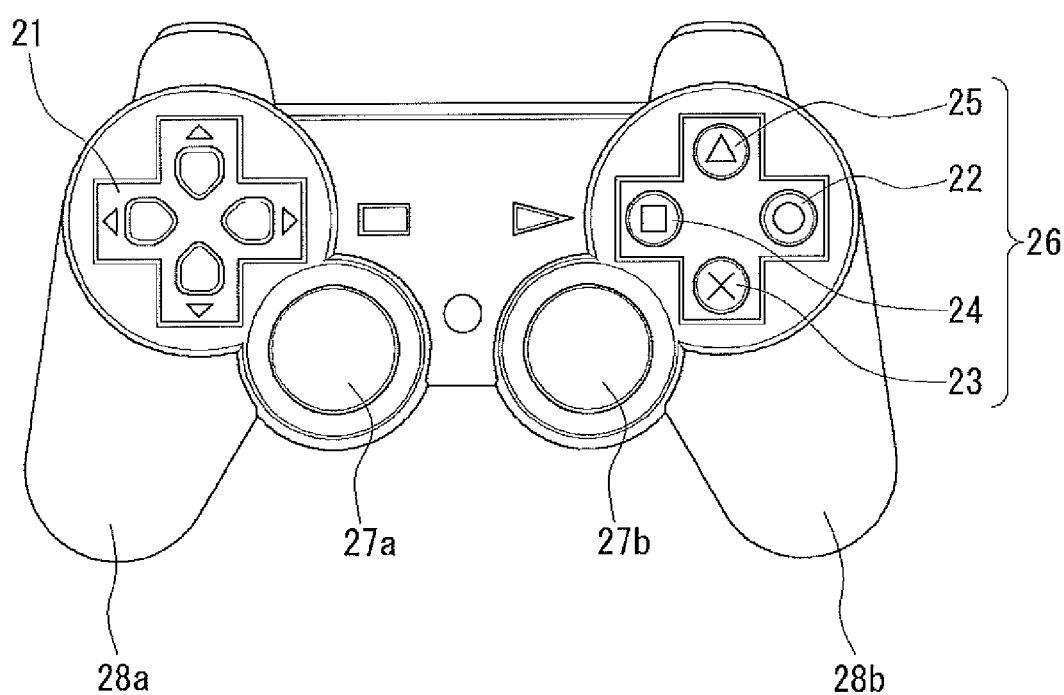
FIG. 2 shows the appearance of an input device that can be applied to the image processing system of FIG. 1.

FIG. 2 shows an example of the appearance of the input device 20. The input device 20 is provided with directional keys 21, analog sticks 27a and 27b, and four control buttons 26 as a means of operation that can be manipulated by a user. The four buttons 26 consist of a circle button 22, a cross button 23, a square button 24, and a triangle button 25.

The means of operation of the input device 20 in the information processing system 1 is assigned the function of entering a request for the movement of the viewpoint, e.g., enlarging/reducing the display area, and entering a request for scrolling up, down, left, or right. For example, the function of entering a request for enlarging/reducing the display area may be allocated to the right analog stick 27b. The user can enter a request to reduce the display area by pulling the analog stick 27b toward the user and can enter a request to enlarge the display area by pushing the analog stick 27b away from the user. The function of entering a request for scrolling the display area may be allocated to the directional keys 21. By pressing the directional keys 21, the user can enter a request for scrolling in the direction in which the directional keys 21 are pressed. The function of entering the request to move the viewpoint may be allocated to other means of operation. For example, the function of entering the request for scrolling may be allocated to the analog stick 27a.

The input device 20 has a function of transferring an input signal that requests to move the viewpoint to the information processing device 10. In the embodiment, the input device 20 is configured to be capable of communicating wirelessly with the information processing device 10. The input device 20 and the information processing device 10 may establish communication using the Bluetooth (registered trademark) protocol, the IEEE802.11 protocol, or the like. The input device 20 may be connected to the information processing device 10 via a cable so as to transfer the signal requesting to move the viewpoint to the information processing device 10 accordingly.

Figure 3:
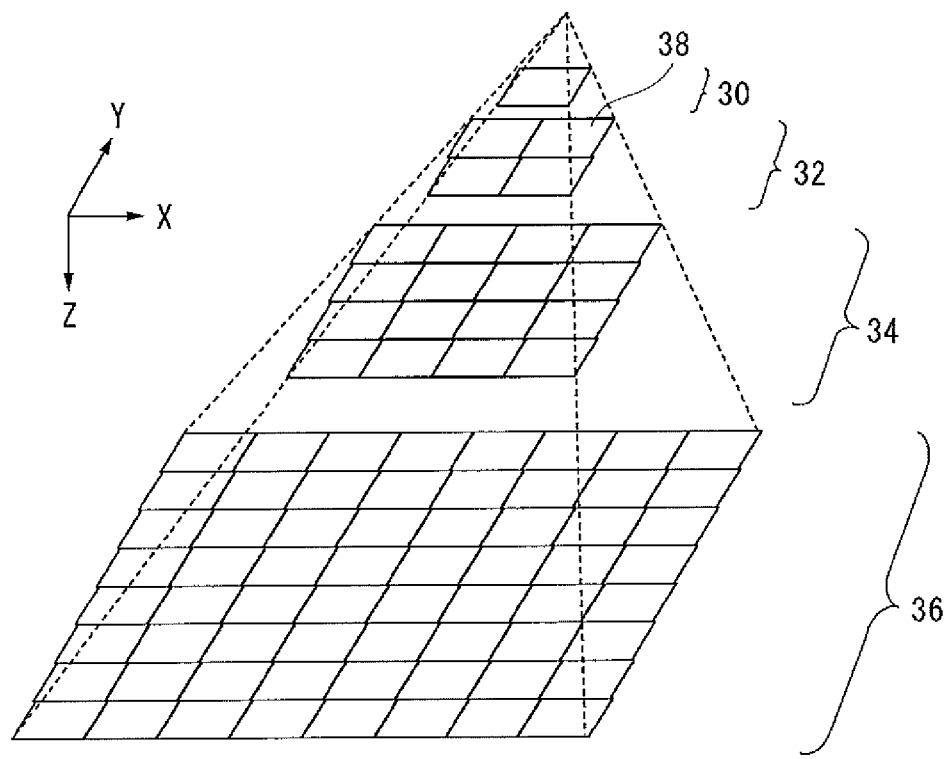
FIG. 3 shows an example of the hierarchical structure of image data used in the first embodiment.

FIG. 3 shows the hierarchical structure of image data used in the embodiment. The image data has a hierarchical structure comprising a 0-th layer 30, a first layer 32, a second layer 34, and a third layer 36 in the direction of depth (z-axis). While the figure only shows four layers, the number of layers is nonrestrictive. Hereinafter, image data having such a hierarchical structure will be referred to as "hierarchical data".

The example of hierarchical data shown in FIG. 3 has a quadtree hierarchical structure. Each layer comprises one or more tile images 38. All of the tile images 38 are formed to have the same size having the same number of pixels. For example, an image includes 256 by 256 pixels. The image data in the respective layers are representations of one image with different resolutions. The original image in the third layer 36 having the highest resolution is reduced in a plurality of stages to generate the image data for the second layer 34, the first layer 32, and the 0-th layer 30. For example, the resolution in the Nth layer (N is an integer equal to or greater than 0) may be ½ the resolution of the (N+1)th layer in both the horizontal (x-axis) direction and the vertical (y-axis) direction.

In the information processing device 10, The hierarchical data is compressed in a predefined compression format and is stored in a storage device. When content is activated, the hierarchical data is read from the storage device and decoded. The information processing device 10 according to the embodiment is provided with a decoding function compatible with a plurality of compression formats. For example, the device is capable of decoding compressed data in the S3TC format, JPEG format, and JPEG2000 format. Compression for the hierarchical data may be performed for each tile image. Alternatively, a plurality of tile images included in the same layer or included in a plurality of layers may be compressed at a time.

As shown in FIG. 3, the hierarchical structure of the hierarchical data is configured such that the horizontal direction is defined along the x-axis, the vertical direction is defined along the y-axis, and the depth direction is defined along the z-axis, thereby building a virtual three-dimensional space. The information processing device 10 derives the distance the display area is to be moved by referring to the signal requesting to move the viewpoint, the signal supplied from the input device 20. Then the information processing device 10 uses the distance of the movement to derive the coordinates at the four corners of a frame (frame coordinates) in the virtual space. The frame coordinates in the virtual space are used to generate a display image. Instead of the frame coordinates in the virtual space, the information processing device 10 may derive information identifying a layer and the texture coordinates (UV coordinates) in the layer. Hereinafter, the combination of the information identifying the layer and the texture coordinates will also be referred to as frame coordinates.

Image data of respective layers included in the hierarchical data is configured such that different image data having different resolutions is discretely located in the z-axis direction. Therefore, when an image is to be displayed with a particular scale factor and the factor is between the scale factors of discretely located other layers and thus there exists no image data of the particular scale factor, image data of a layer in the vicinity of the scale factor in the z-axis direction is used. For example, the scale factor of a display image is in the vicinity of the second layer 34, the display image is generated while using the image data of the second layer. In order to implement this, a switching boundary of source images defined between respective layers, for example at the midpoint. If a scale factor changes and crosses over the switching boundary, the image data to be used for creating the display image is switched so that an enlarged or reduced image is displayed.

Figure 4:
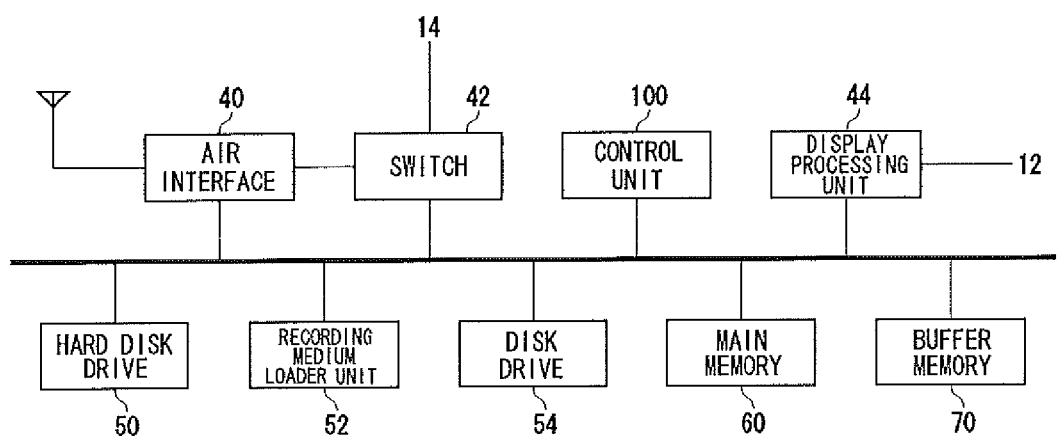
FIG. 4 shows the configuration of the information processing device according to the first embodiment.

FIG. 4 shows the configuration of the information processing device 10. The information processing device 10 comprises an air interface 40, a switch 42, a display processing unit 44, a hard disk drive 50, a recording medium loader unit 52, a disk drive 54, a main memory 60, a buffer memory 70, and a control unit 100. The display processing unit 44 is provided with a frame memory for buffering data to be displayed on the display of the display device 12.

The switch 42 is an Ethernet switch (Ethernet is a registered trademark) and is a device connected to an external device by cable or wirelessly so as to transmit and receive data. The switch 42 may be connected to an external network via the cable 14 so as to receive a content file including compressed hierarchal image data and a definition file for implementing various functions using the image. A content file may further include data necessary for implementing various functions, for example, compressed and encoded moving image data, music data, data associating the names of websites and their respective URLs (Uniform Resource Locator), or the like.

The switch 42 is connected to the air interface 40. The air interface 40 is connected to the input device 20 using a predefined wireless communication protocol. A signal requesting to move a viewpoint, which is input by the user via the input device 20, is supplied to the control unit 100 via the air interface 40 and the switch 42.

The hard disk drive 50 functions as a storage device for storing data. Various data received via the switch 42 is stored in the hard disk drive 50. When a removable recording medium such as a memory card is mounted, the recording medium loader unit 52 reads data from the removable recording medium. When a ROM disk is mounted, the disk drive 54 drives and recognizes the ROM disk so as to read data. The ROM disk may be an optical disk or a magneto-optical disk. The content files may be stored in the recording medium.

The control unit 100 is provided with a multicore CPU. One general-purpose processor core and a plurality of simple processor cores are provided in a single CPU. The general-purpose processor core is referred to as a power processor unit (PPU) and the other processor cores are referred to as synergistic-processor units (SPU).

The control unit 100 is provided with a memory controller connected to the main memory 60 and the buffer memory 70. The PPU is provided with a register and a main processor as an entity of execution. The PPU efficiently allocates tasks as basic units of processing in applications to the respective SPUs. The PPU itself may execute a task. The SPU is provided with a register, a subprocessor as an entity of execution, and a local memory as a local storage area. The local memory may be used as the buffer memory 70.

The main memory 60 and the buffer memory 70 are storage devices and are formed as random access memories (RAM). The SPU is provided with a dedicated direct memory access (DMA) controller and is capable of high-speed data transfer between the main memory 60 and the buffer memory 70. High-speed data transfer is also achieved between the frame memory in the display processing unit 44 and the buffer memory 70. The control unit 100 according to the embodiment implements high-speed image processing by operating a plurality of SPUs in parallel. The display processing unit 44 is connected to the display device 12 and outputs a processing result in accordance with a user request.

The information processing device 10 according to the embodiment may be configured to load in advance at least a part of the compressed image data from the hard disk drive 50 into the main memory 60 in order to change display images smoothly as the viewpoint moves. Further, the device 10 may be configured to predict an area to be displayed in the future based on the user request to move the viewpoint, and to decode a part of the compressed image data loaded into the main memory 60 and store the decoded data in the buffer memory 70. This enables instant switching of images used for the creation of the display image at a proper time when required afterwards.

Figure 5:
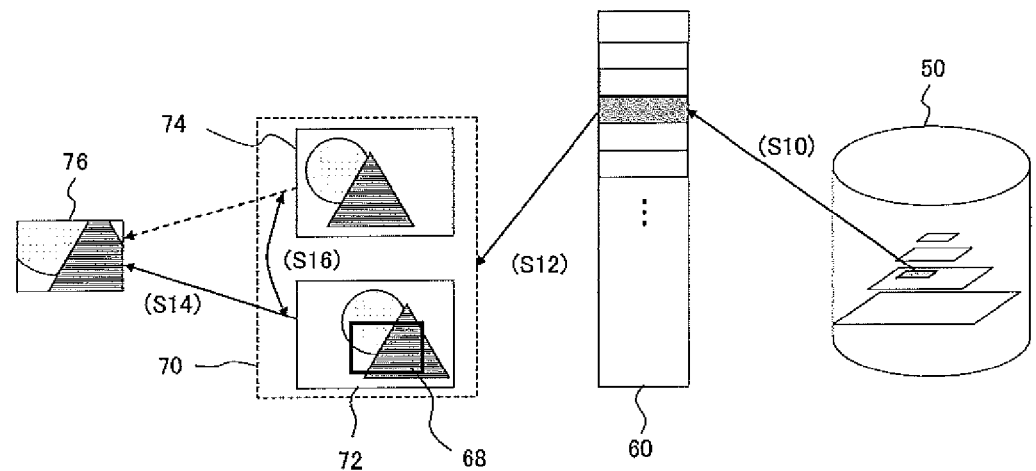
FIG. 5 schematically shows the flow of image data according to the first embodiment.

FIG. 5 schematically shows the flow of image data according to the embodiment. First, the hierarchical data included in the content file is stored in the hard disk drive 50. The data may be stored on a recording medium mounted on the recording medium loader unit 52 or the disk drive 54 instead of the hard disk 50. Alternatively, the information processing device 10 may download hierarchical data from an image server connected to the device 10 via the network. As described above, the hierarchical data is compressed in a fixed-length format such as S3TC or in a variable-length format such as JPEG.

Of the hierarchical data, at least a part of the image data is loaded into the main memory 60, while maintaining a compressed state (S10). An area to be loaded is determined according to a predefined rule. For example, an area close in the virtual space to the image currently displayed, or an area predicted to be frequently requested for display, based on the content of image or the history of browsing by the user, is loaded. The data is loaded not only when it is requested to move the viewpoint but also at predefined time intervals. This prevents a heavy processing load from occurring in a brief period of time.

Of the compressed image data stored in the main memory 60, data for an image of an area required for display, or data for an image of an area predicted to be required is decoded and stored in the buffer memory 70 (S12). The buffer memory 70 includes at least two buffer areas 72 and 74. The size of the buffer areas 72 and 74 is configured to be larger than that of the frame memory 76 so that the image data expanded in the buffer areas 72 and 74 is sufficient to create a display image for a certain degree of movement when a signal requesting the viewpoint to be moved is entered via the input device 20.

One of the buffer areas 72 and 74 is a display buffer used to store an image for creation of display image and the other is a decoding buffer used to make available an image predicted to become necessary subsequently. In the example of FIG. 5, the buffer area 72 is a display buffer, the buffer area 74 is a decoding buffer, and a display area 68 is being displayed.

Next, of the images stored in the buffer area 72, i.e., the display buffer, the image of the display area 68 is rendered in the frame memory 76 (S14). Meanwhile, the image of a new area is decoded as necessary and stored in the buffer area 74. The display buffer and the decoding buffer are switched depending on the time of completion of storage or the amount of displacement of the display area 68 (S16). This allows smooth switching between display images in the event the display area is moved or there is a change in scale.

Figure 6:
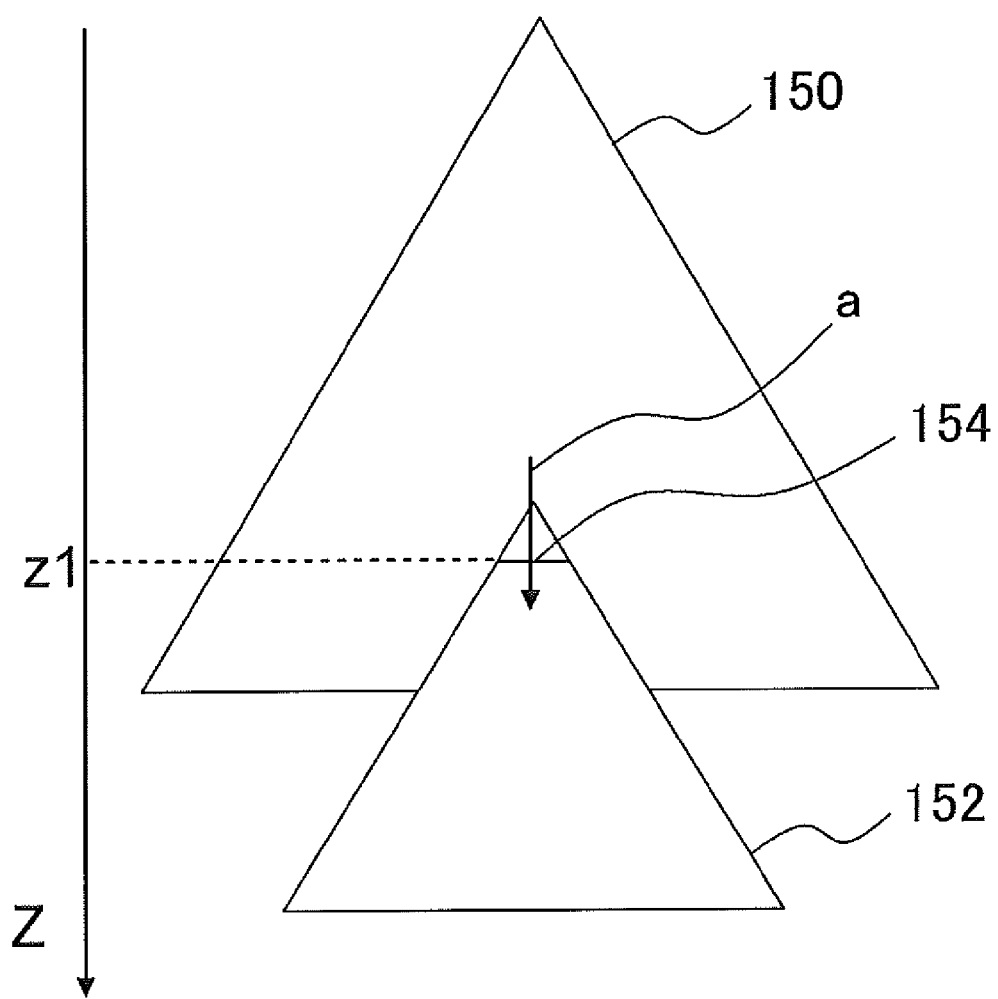
FIG. 6 schematically shows the relationship among a plurality of sets of hierarchical data to be displayed according to the first embodiment.

The process described so far concerns a mode in which a frame coordinate is moved in order to move, enlarge, or reduce the display area of an image in accordance with a user request to move a viewpoint in a virtual space formed by a single set of hierarchical data as shown in FIG. 3. Meanwhile, a plurality of sets of hierarchical data may be provided for displaying, and the display image may go back and forth between the hierarchical data sets. FIG. 6 schematically shows a relationship among a plurality of sets of hierarchical data that can be displayed according to such mode.

Referring to FIG. 6, two triangles indicate different sets of hierarchical data 150 and 152. Each of the hierarchical data 150 and 152 is actually configured as shown in FIG. 3 such that a plurality of pieces of data of different resolutions are discretely located along the z-axis direction of the figure. When the user requests to enlarge/reduce a display area via the input device 20, the display, i.e., the viewpoint, moves in the z-axis direction of the figure. Meanwhile, when the user requests to move the display area up, down, left, or right, the display image moves on the horizontal plane of the figure. In such a virtual space, the two sets of hierarchical data 150 and 152 establish image data where two sets of data overlap as shown in the figure.

When the user continuously requests for enlargement while an image of the hierarchical data 150 is displayed, the viewpoint moves as indicated by an arrow "a", and enters into the area of the hierarchical data 152. In other words, the viewpoint moves between the hierarchical data sets. If the viewpoint enters into the area of different hierarchical data set, data used for creating the display image is switched from the hierarchical data 150 to the hierarchical data 152. This process can be implemented by the processing steps of displaying image described so far, by merely modifying the hierarchical data to be loaded to the main memory 60.

The resolution of the image and the position in the image when switching the hierarchical data 150 and 152 are predefined in order to establish image data comprising a plurality of sets of hierarchical data as shown in FIG. 6. This definition is shown as a line 154 in FIG. 6. In this way, the amount of overlap between the hierarchical data sets can be determined. In the illustrated example, switching from the hierarchical data 150 to the hierarchical data 152 takes place at a position characterized by the resolution z1 defined along the z-axis and located on the line 154. Hereinafter, such switching between hierarchical data sets will be referred to as "link". Images of respective hierarchical data sets to be switched may be of a same image of different scales, or may be completely different images.

As an alternative to the switching of the display image to that of the hierarchical data 152, other processes (such as playing back a moving image, playing back sound, further processing on a display image, moving a display area) may be performed. In this case, a link point for the hierarchical data 150 is predetermined in a similar manner as that of the line 154, and if the viewpoint reaches to the point, a process associated with the point is activated.

In this way, a mode can be achieved where the user moves the viewpoint so as to approach towards a certain area while watching an image of the hierarchical data 150, information associated to the area is displayed, an associated moving image is played back, or an associated application is activated, accordingly. By providing a plurality of such areas in one piece of image data, a menu screen can be formulated where a process is selected from a plurality of processes and the selected process is operated, accordingly. Such a process activated by the movement of the viewpoint is referred to as an "embedded object." The association between image data and an embedded object is also referred to as a "link."

Figure 7:
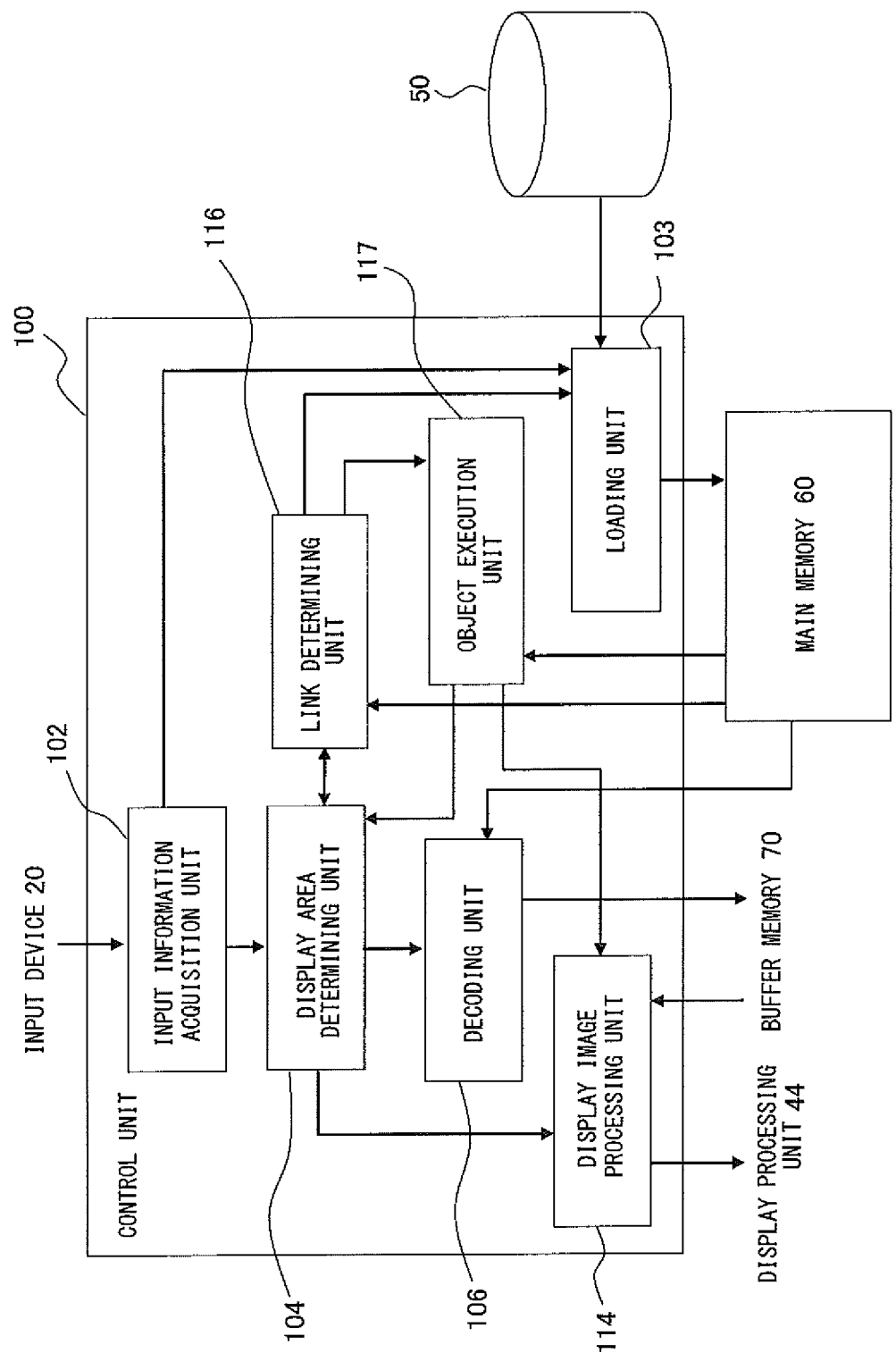
FIG. 7 shows, in detail, the configuration of a control unit according to the first embodiment.

FIG. 7 shows in detail the configuration of the control unit 100 according to the embodiment. The control unit 100 comprises an input information acquisition unit 102 that acquires information entered by the user via the input device 20, a loading unit 103 that loads a set of hierarchical data to be displayed from the hard disk drive 50, a display area determining unit 104 that determines a display area in accordance with the input, a decoding unit 106 that decodes compressed image data, and a display image processing unit 114 that renders display image. The control unit 100 further comprises a link determining unit 116 that determines whether a viewpoint meets a defined condition of linking, and an object execution unit 117 that executes an embedded object.

The elements depicted in FIG. 7. as functional blocks for performing various processes are implemented in hardware such as a central processing unit (CPU), memory, or other LSI's, and in software such as in programs, etc., loaded into the memory. As describe above, the control unit 100 includes one PPU and a plurality of SPUs. The PPU and the SPUs form the functional blocks alone or in combination. Therefore, it will be obvious to those skilled in the art that the functional blocks may be implemented in a variety of ways, such as by hardware only, software only, or a combination thereof.

In the hard disk drive 50, a content file is stored. The content file includes hierarchical data and a definition file that describes information on a link defined for the hierarchical data. In case of displaying image data comprising images in a plurality of sets of hierarchical data, a plurality of sets of hierarchical data and definition files corresponding to respective sets are stored. As necessary, the content file may further include data required for the processing of the embedded object, such as, moving image data, sound data, image module data, an application program for a game or the like, etc.

In accordance to user operation via the input device 20, the input information acquisition unit 102 acquires information relating to a request (e.g., the start/completion of content, moving the viewpoint, etc.) from the input device 20 and notifies the display area determining unit 104 and/or the loading unit 103 of the information, as necessary. Upon being notified from the input information acquisition unit 102 that the request for starting the content is made, the loading unit 103 reads the hierarchical data of the initial image of the content and the definition file thereof from the hard disk drive 50 and stores the data into the main memory 60.

As necessary, the loading unit 103 further reads the hierarchical data of the destination of the displacement of the viewpoint, data necessary for the execution of the embedded object, or the like from the hard disk drive 50 and stores the data into the main memory 60. Upon being notified by the input information acquisition unit 102 that the request for moving the viewpoint is made, the display area determining unit 104 transforms the amount of displacement of the viewpoint to the coordinate in the virtual space of the hierarchical data, and determines the frame coordinate of the destination of the movement to be displayed.

The decoding unit 106 reads a part of compressed image data from the main memory 60, decodes the data and stores the decoded data into the buffer memory 70. The data that the decoding unit 106 decodes may be image data of a predetermined size including the display area. By decoding a wide area of image data and storing the decoded data into the buffer memory 70 in advance, the number of read accesses to the main memory 60 can be reduced and the viewpoint can be moved smoothly.

The display image processing unit 114 acquires the frame coordinate of the area to be displayed determined by the display area determining unit 104, reads corresponding image data from the buffer memory 70, and renders the data into the frame memory 76 of the display processing unit 44. The link determining unit 116 refers to the definition file that is stored into the main memory 60 and is associated with the hierarchical data set being currently displayed. Then the unit 116 determines whether or not the viewpoint of the destination of the movement meets the condition for the link. A link destination defined according to the embodiment comprises a link to another hierarchical data set and a link to an embedded object.

In case that the link determining unit 116 determines that the condition for the link to an embedded object is satisfied, the object execution unit 117 executes the corresponding embedded object. In case a program or data for executing the embedded object is not stored in the main memory 60, the loading unit 103 loads the program or data from the hard disk drive 50 to the main memory 60. Types or modes of the process executed by the object execution unit 117 are nonrestrictive. Therefore, the object execution unit 117 may execute different sorts of processes as appropriate in accordance with the position of the viewpoint and with the setting of the definition file.

In case a certain process is applied on the image being currently displayed as the operation of one of the embedded objects, the object execution unit 117 issues a request thereof to the display image processing unit 114 and the display image processing unit 114 renders the processed image. In case the viewpoint for the image being currently displayed is moved as the operation of one of the embedded objects, the object execution unit 117 issues a request thereof to the display area determining unit 104, and the display area determining unit 104 determines the display area of the destination of the movement. In case a moving image or a sound is to be played back, the object execution unit 117 reads the moving image data or the audio data from the main memory 60, decodes the data, and outputs to the display processing unit 44 or to a speaker of the display device 12.

In case the link determining unit 116 determines that the condition for the link to another set of hierarchical data is satisfied, and if the hierarchical data of the link destination is not stored in the main memory 60, the loading unit 103 loads the data from the hard disk drive 50. The display area determining unit 104 acquires the determination results from the link determining unit 116 and transforms the frame coordinate to that of the hierarchical data of the link destination, and then notifies the decoding unit 106 of the coordinates along with the identification information of the hierarchical data. In response, the decoding unit 106 defines the hierarchical data of the link destination as data that should be processed.

Figure 8:
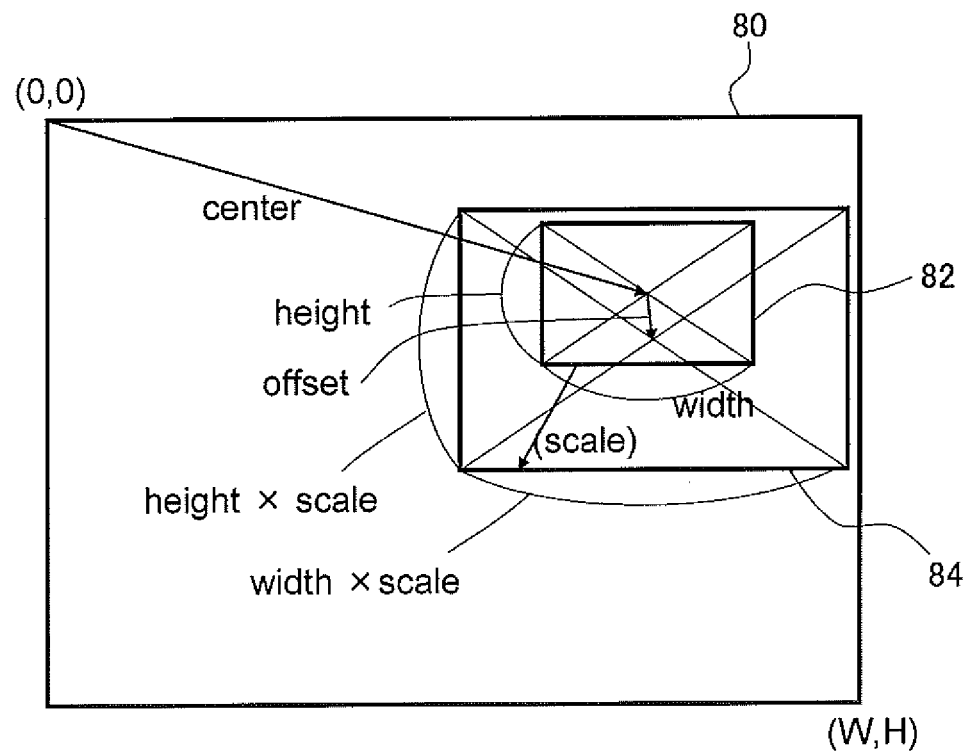
FIG. 8 shows an example of the definition of a target rectangle and a bounding rectangle according to the first embodiment.

Next, an explanation will be given on an example of the setting of the definition file. FIG. 8-11 shows an example of the definition of respective data in the definition file. FIG. 8 shows an example of the definition of a target rectangle and a bounding rectangle. In the figure, the target rectangle 82 is an area in the image where a target for setting the link is displayed. Alternatively, the target rectangle 82 may be a rectangular area that circumscribes the area where a target for setting the link is displayed. The bounding rectangle 84 is a rectangle indicating the range of the viewpoint position where the link is determined to be valid. That is, in case the viewpoint enters into the bounding rectangle 84, the link of the target rectangle 82 becomes valid and then the display is switched to a different set of hierarchical data of the link destination, an embedded object is activated, etc.

In this example, the target rectangle 82 and the bounding rectangle 84 are defined relative to the reference rectangle 80 indicating a reference coordinate where the coordinate of upper left vertex is (0, 0) and the coordinate of lower right vertex is (W, H). The reference rectangle 80 can be construed as an entire image to be displayed. A unit for the coordinate can be defined, for example as a pixel. First, the distance from the upper left vertex (0, 0) of the reference rectangle 80 to the center of the target rectangle 82 is defined as a "center" parameter, the height of the target rectangle 82 is defined as a "height" parameter, and the width is defined as a "width" parameter, and the target rectangle 82 is defined using those three parameters.

The distance from the center of the target rectangle 82 to the center of the bounding rectangle 84 is defined as a "offset," and the scale factor of the bounding rectangle 84 to the target rectangle 82 is defined as a "scale," and the bounding rectangle 84 is defined using those two parameters. Accordingly, the height of the bounding rectangle 84 is the "height" times the "scale", and the width of the bounding rectangle 84 is the "width" times the "scale" as shown in the figure. Although the "center" parameter and the "offset" parameter have a horizontal component and a vertical component respectively, the components are represented collectively in the figure.

Figure 9:
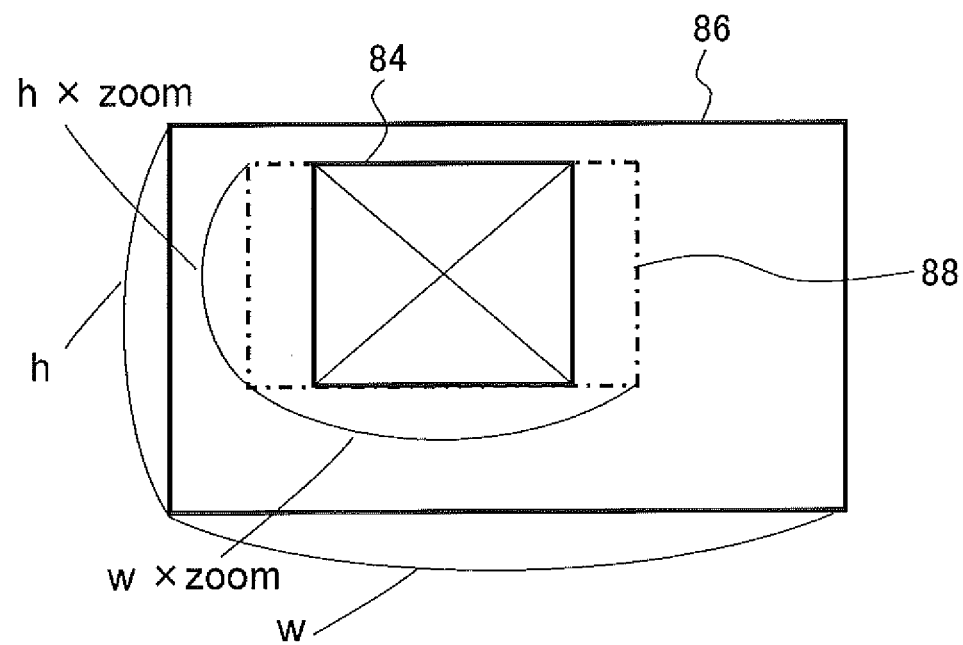
FIG. 9 shows an example of the definition of the scale factor of the bounding rectangle according to the first embodiment.

FIG. 9 shows an example of the definition of the scale factor of the bounding rectangle. According to the embodiment, the display area not only moves on a certain plane surface, but also accepts the movements along the z-axis in the virtual space described above (i.e., the enlargement or reduction of an image). Therefore, by utilizing the movement for the definition of a link, the link can be defined in detail with abundant variations while being easy-to-understand for a user. As one of the methods for defining the link, an upper limit and/or a lower limit of the scale factor of the bounding rectangle can be set.

In FIG. 9, the rectangle having height h and width w represents the screen 86 of the display device. A rectangle 88 is formed by extending the bounding rectangle 84 in the vertical direction or in the horizontal direction so that the rectangle 88 has the aspect ratio of the screen 86 (i.e., h:w). The scale factor of the rectangle 88 to the screen 86 is defined as a "zoom" parameter that indicates the scale factor of the bounding rectangle 84. Accordingly, the vertical length and the horizontal length of the rectangle 88 are "h" times "zoom" and "w" times "zoom", respectively, as shown in the figure.

Figure 10:
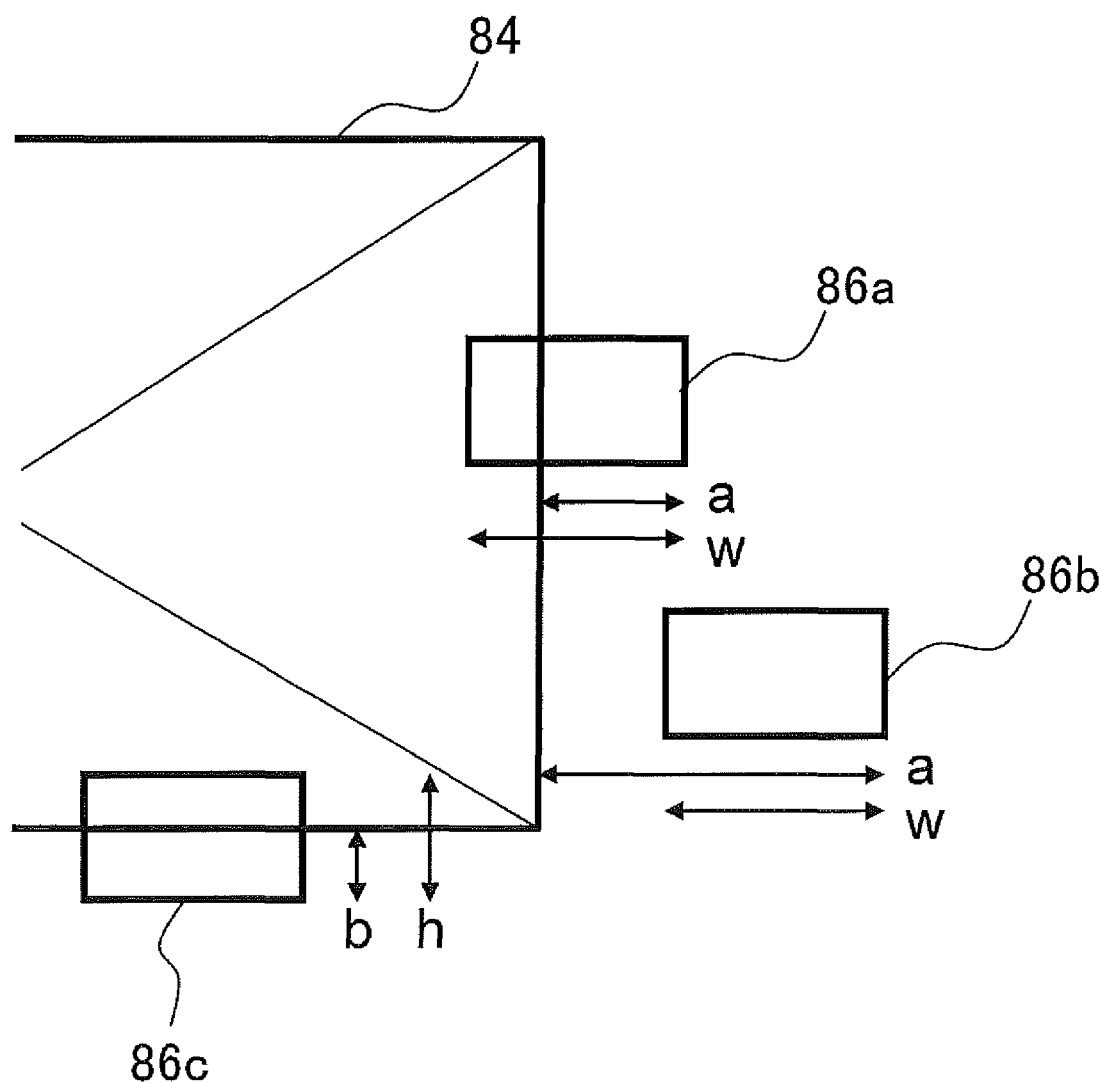
FIG. 10 shows the definition of an "overshoot" parameter that represents the ratio of a part of a screen that protrudes from the edge of the bounding rectangle according to the first embodiment.
Figure 11:
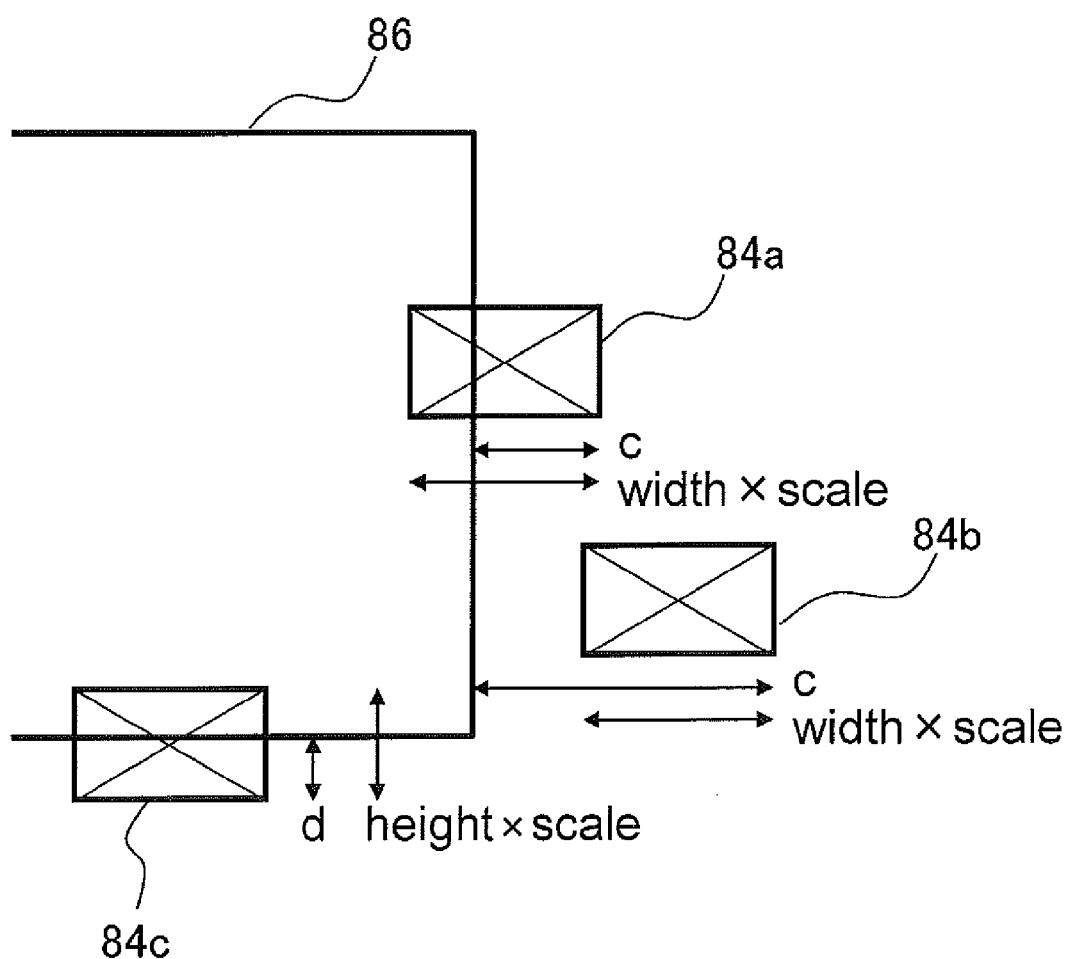
FIG. 11 shows the definition of an "invisibility" parameter that represents the ratio of a part of the bounding rectangle that protrudes from the edge of the screen according to the first embodiment.

FIGS. 10 and 11 show the definition of the positional relation between the bounding rectangle and an area displayed on the screen (hereinafter, referred merely as a "screen"). FIG. 10 shows the definition of an "overshoot" parameter representing the ratio of a part of a screen that protrudes from the edge of the bounding rectangle. FIG. 10 shows three patterns as the screen: screens 86a, 86b, and 86c. In FIG. 10, "a" indicates the length of part of the screen that protrudes from the edge of the bounding rectangle 84 in the horizontal direction (screen 86a, 86b), and "b" indicates the length of part of the screen that protrudes from the edge in the vertical direction (screen 86c), respectively. The "overshoot" parameter is defined as max(a/w, b/h). That is, when the bounding rectangle protrudes from the edge of the screen in one of the vertical or horizontal direction, the parameter is defined as the ratio of the length of the part that protrudes from the edge (a or b) to the length of the screen (w or h). When the bounding rectangle protrudes from the edge of the screen in the both directions, the larger ratio is adopted as the parameter.

FIG. 11 shows the definition of an "invisibility" parameter representing the ratio of a part of the bounding rectangle that protrudes from the edge of the screen. FIG. 11 shows three patterns of the bounding rectangles: bounding rectangles 84a, 84b, and 84c. In the figure, "c" indicates the length of part of the bounding rectangle that protrudes from the edge of the screen 86 in the horizontal direction (bounding rectangle 84a, 84b), and "d" indicates the length of part of the bounding rectangle that protrudes from the edge in the vertical direction (bounding rectangle 84c), respectively. The "invisibility" parameter is defined as max (c/width×scale, d/height×scale). That is, when the bounding rectangle protrudes from the edge of the screen in one of the vertical or horizontal direction, the parameter is defined as the ratio of the length of the part that protrudes from the edge (c or d) to the length of the bounding rectangle (width×scale or height×scale). When the bounding rectangle protrudes from the edge of the screen in the both directions, the larger ratio is adopted as the parameter.

FIG. 12 shows an example of the definition file described in XML, using the parameters described above. In lines (1) to (4) of the exemplary definition file 200, a description is given regarding the home position of the corresponding hierarchical data, and the scale factor at the time of displaying the home position is defined as the "zoom" parameter in line (3) by using an attribute "view". The "home position" is an initial image of the content, i.e., a display area that can be displayed by pressing a predetermined button of the input device 20. In this example, an image of the scale factor 0.85 is defined as the home position.

In lines (6) to (9), a description is given regarding a range which can be displayed, wherein the range of the viewpoint is defined using the attribute "boundary" in line (8). A "stretch" parameter is a scale factor indicating how many pixels one pixel of the highest resolution layer of the hierarchical data is extended. In other words, the parameter is the ratio of the resolution of the display device to the resolution of the image. For example, if an area of 960 by 540 pixels of an image of 19200 by 10800 pixels as a whole is displayed on the display device having the resolution of 1920 by 1080 pixels, the "stretch" parameter is set to "2.0." In FIG. 12, the upper limit for the parameter is set as "max_stretch."

By defining this way, the maximum scale factor allowed when displaying on the screen can be adjusted automatically in accordance with the resolution of the respective display devices. Therefore, image can be displayed at a similar image quality regardless of the resolution of respective display devices. Further, "min_zoom" that is the lower limit of the "zoom" parameter described above, and the "max_overshoot" that is the upper limit of the "overshoot" parameter described above are defined as an allowed range when displaying. In this example, the lower limit of the scale factor defined by the "zoom" parameter is defined as "0.85" and the ratio of a part of the screen that protrudes from the edge of an image is defined as "0.5." Users can move and/or enlarge/reduce the display image within the defined range.

In lines (11) to (16), a description is given regarding the link to another hierarchical data set. The lines (12) and (13) define the target rectangle of the link. The attribute "target" defines the path of the definition file of the link destination. The attribute "direction" defines the direction (e.g., enlarging direction or reducing direction) that triggers the switching to the hierarchical data of the link destination. In the example shown in FIG. 12, the attribute file of the hierarchical data of the link destination is defined as "a.xml," and the direction of the link is set as "forward", i.e., the data is switched when enlarging. The attribute file and the hierarchical data set are associated, for example, by using a same file name except for the extension part.

In addition, the position of the target rectangle is defined by the "center_x" and the "center_y", which are the horizontal and the vertical components of the "center" parameter described above, respectively. The size of the rectangle is defined by the "width" parameter and the "height" Parameter.

In lines (14) and (15), a "link boundary" with which the link is determined to be valid is defined using the attribute "boundary." The "link boundary" is an extension of the "bounding rectangle" on the image plane, the extension being in the z-axis direction in the virtual space. The extension is defined by the attribute "boundary." If the viewpoint enters in the link boundary, the condition of the link is determined to be satisfied. The attribute "action" is set as "jump" in line (14), which defines that the hierarchical data is switched in case the viewpoint enters into the link boundary of this setting.

Figure 13:
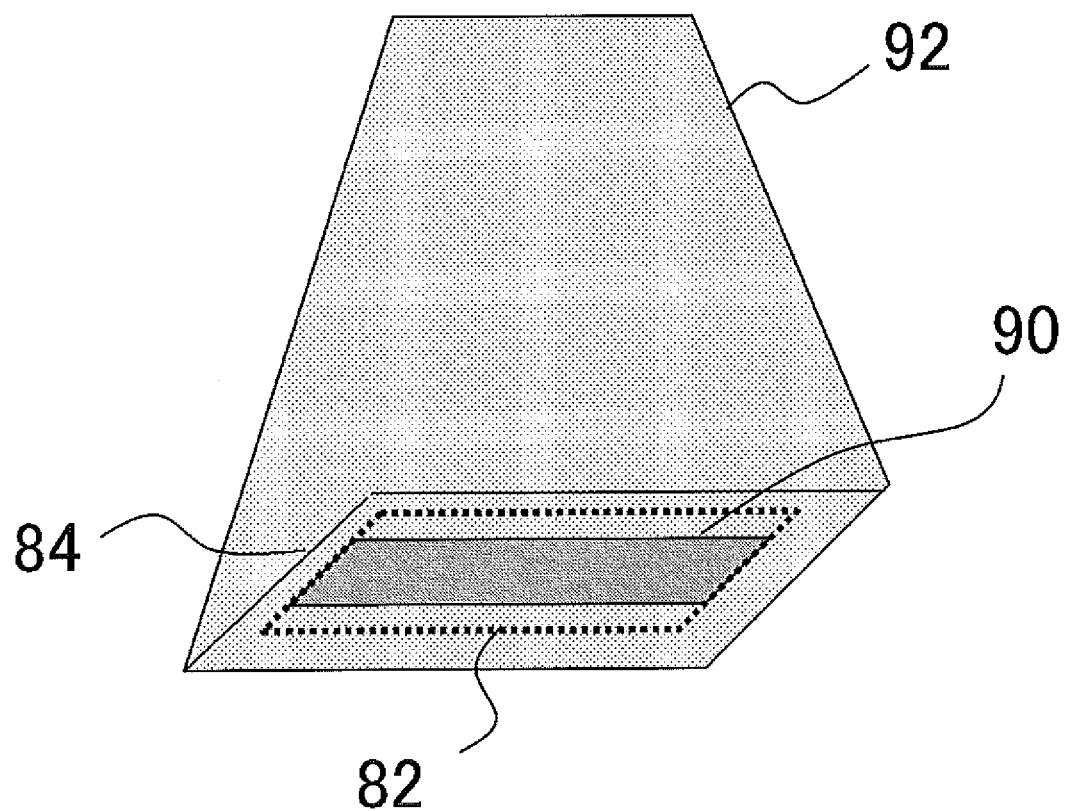
FIG. 13 shows a relationship among the target rectangle, the bounding rectangle, and a link boundary according to the first embodiment.

FIG. 13 shows a relationship among the target rectangle 82, the bounding rectangle 84 and the link boundary. In the figure, the horizontal plane including the target rectangle 82 represents the image plane, and the vertical direction represents enlargement or reduction of the image, i.e., the distance of the viewpoint from the image plane. The rectangle 90 inscribed in the target rectangle 82 is an image of the hierarchical data of the link destination. The bounding rectangle 84 is defined on the image plane of the target rectangle 82 in a similar manner as shown in FIG. 9.

According to the embodiment, if the viewpoint moves in the space such as the one shown in the figure and comes close to the target rectangle 82, the link is set to be valid. Therefore, validity or invalidity of a link can be defined not only by the position on the image plane but also by the proximity of the viewpoint. Thus, the link boundary is formed three dimensionally in contrast to the image plane as shown in the figure.

Referring back to FIG. 12, line (15) of the definition file defines the size of the bounding rectangle with the "scale" parameter described above, and the position with parameters "offset_x" and "offset_y," which are the horizontal component and the vertical component of the "offset" parameter described above, respectively. Further, in order to define the link boundary in accordance with the proximity of the viewpoint, the upper limit of the ratio of apart of the screen that protrudes from the bounding rectangle, "max_overshoot" and the minimum scale factor of the bounding rectangle, "min_zoom" are defined. The explanation on the advantage of defining the "max_overshoot" parameter will be given later.

In lines (18) to (23), a description is given regarding the playback of moving image included in the embedded objects. In line (19), an moving image file to be embedded is defined as "b.mp4" by the attribute "source." In line (20), the target rectangle is defined in a similar manner as shown in line (13). Further, lines (21) and (22) define the link boundary for executing the playback of a moving image by the attribute "boundary." The link boundary is similar as the one shown in FIG. 13. The moving image is displayed in the center of the target rectangle with a position and a size that allow the moving image to be inscribed in the target rectangle.

The line (21) that sets the attribute "action" as "show" defines a condition for switching a displayed image to a preliminary image before actually displaying a moving image. As the preliminary image, for example, the first frame of the moving image is displayed as a still image. The line (22) that sets the attribute "action" as "play" defines a condition for playing back the moving image and displaying the image as a moving image. This enables the achievement of a mode where zooming in to the target rectangle that displays the title of the moving image first allows the still image of the first frame to be displayed, and further, enlargement of the target rectangle allows the moving image to be played back, accordingly.

Definition example of FIG. 12 is one such case. According to the case of the figure, when the "min_zoom" parameter is "0.20," the first frame is displayed (line (21)), and when the "min_zoom" parameter is "0.35," the moving image is played back. Allowing to set two steps of operations in this way eliminates the trouble wherein merely bringing the viewpoint close to an area causes displaying of a moving image even is not necessary. Further, the time-lag that arises by the time of the display of the moving image can be absorbed by the first step wherein a still image is displayed. In case the viewpoint leaves the link boundary for playback of the moving image, the playing back of the moving image also stops. In this step, while the viewpoint is within the link boundary for the first step of displaying a still image, a frame image of the time when the playback of the moving image is suspended is displayed as a still image.

Lines (21) and (22) further define, for each attribute "action", "max_overshoot" that is the upper limit of the ratio of a part of the screen that protrudes from a bounding rectangle and "max_invisibility" that is the upper limit of the ratio of a part of the bounding rectangle that protrudes from a screen, respectively. An explanation on the advantage of defining the "max_invisibility" parameter will be given later.

In lines (25) to (29), a description is given regarding the playback of sound included in the embedded objects. In line (26), an audio file to be embedded is defined as "c.mp3" by the attribute "source." In line (27), the target rectangle of the embedded object is defined in a similar manner as shown in line (20). Further, line (28) defines the link boundary for executing the playback of sound by the attribute "boundary" in a similar manner as that of playing back a moving image. However, the attribute "action" defines only "play" that indicates playback.

Also in the case of playing back sounds, if the viewpoint enters in the link boundary, the playback of a sound is started, and if the viewpoint leaves the link boundary, the playback of a sound is suspended. Alternatively, if another sound has been played back originally, the sounds are switched. For both cases of a moving image and a sound, a resume process may be applied. In the resume process, when the playback is suspended, a suspension point on the data stream of the moving image or the sound may be stored in the main memory 60 or the like, and in case the viewpoint enters into the link boundary again, the playback is started from the suspension point.

In lines (31) to (35) a description is given regarding the link to a store on the network (store link) included in the embedded objects. The line (32) defines the identification information of the store, such as the name or the like, as "store: AAA" by the attribute "source." The line (33) defines the target rectangle of the store link in a similar manner as described above. Another file for associating the identification information of the store and the position in the network such as an URL or the like is stored in the main memory 60.

The line (34) defines the link boundary that allows to move to the site of the store by the attribute "boundary" in a similar manner as described above. By defining the attribute "action" as "show_link," a process regarding the link to the store is defined. The process regarding the link is, for example, a process on the display image, for example, displaying an indicator showing that it is possible to move to the website of the store. The settings described in lines (31) to (35) may not necessarily be the link to the store but may be a link to the site published on the network besides the store, a link to a file stored in hard disk, or the like.

On lines (37) to (67), a description is given regarding a selection acknowledging display included in the embedded objects. The selection acknowledging display is a process where an area which can be a target for enlargement (for example, an area where a link is defined, or the like) is displayed with an emphasis as an option, and if a user selects one of such areas, an image is moved to the selected area. For example, in case that there are a plurality of areas for which a link is defined, the color of each area is changed at the time point when the area is displayed at a scale factor that allows the user to select the area, so as to indicate that the user can select that area. Upon pressing down a key indicating a direction (e.g., the directional keys 21) of the input device 20 in this situation, the selected area is moved. Upon performing selection operation using the circle button 22 or the like, the viewpoint is shifted so that the selected area is positioned at the center of the screen or so that the area is zoomed. This simplifies the movement of the viewpoint and enables effective movement to a desired link destination or to a desired part of the image.

The line (39) defines a "link boundary" for acknowledging the selection by the attribute "boundary". The parameters to be defined are similar as those described previously. The lines (40) to (43), lines (44) to (47), lines (48) to (51), and lines (52) to (66) specify the rectangles for options by the attribute "option," respectively. For each option, the color is specified by the attribute "frame_color." This allows the rectangles for options to be displayed with emphasis. Further, the position and the size of each rectangle are defined in a similar manner as that of the target rectangle.

In addition, a viewpoint for a display of the case that one of the options is selected is defined by the attribute "view." The parameters used for the definition are similar as those described previously. It is indicated that the options defined in lines (52) to (66) includes descendant options defined in lines (55) to (65). By explicitly indicating this, the descendant options can be omitted from the options to be selected when the selection for antecedent options is to be acknowledged.

Figure 14:
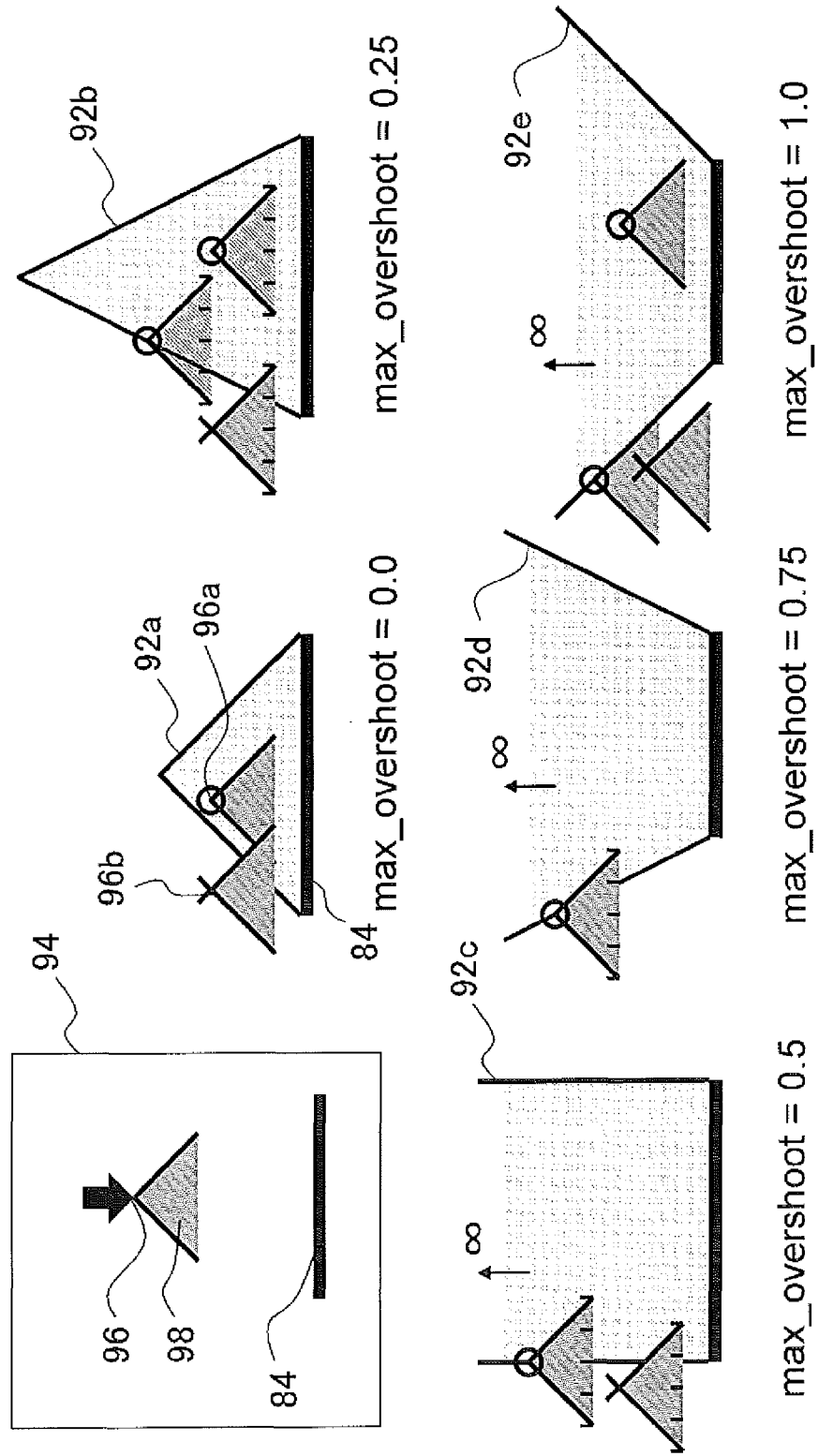
FIG. 14 shows the variations of the link boundary when a "max_overshoot" parameter is varied according to the first embodiment.

Next, an explanation will be given on the "max_overshoot" parameter and the "max_invisibility" parameter. FIG. 14 shows the variations of the link boundary when the "max_overshoot" parameter is varied. As shown in the box 94, the figure represents the side view of the positional relation between the field of view 98 viewed from the viewpoint 96, and the bounding rectangle 84 and indicates the variations of the link boundary where the "max_overshoot" parameter varies as 0.0, 0.25, 0.5, 0.75, and 1.0.

First, assume the case where the "max_overshoot" is 0.0, i.e., where the parameter is defined so that the screen does not protrude from the edge of the bounding rectangle. Since the bottom of the triangle representing the field of view (i.e., the screen) for the viewpoint 96a is included in the upside region of the bounding rectangle 84, the screen for the viewpoint 96a does not protrude from the edge of the bounding rectangle. Thus, the viewpoint 96a is in the link boundary. Meanwhile, in case of the viewpoint 96b, the bottom of the triangle that represents the field of view for the viewpoint 96b protrudes from the upside region of the bounding rectangle 84, i.e., the area surrounding the bounding rectangle 84 is also included in the screen. Therefore, the viewpoint 96b is at outside of the link boundary. A circle is marked on a viewpoint at inside of the link boundary and a christcross is marked on a viewpoint at outside of the link boundary.

By considering in this way, the link boundary of the class of viewpoints that meet the condition that the "max_overshoot" equals "0.0" forms a shape like that of the link boundary 92a. Similar consideration applies to cases where the "max_overshoot" parameter is 0.25, 0.5, 0.75, and 1.0, respectively. In case the "max_overshoot" is 0.25, the link is set to be valid even if one fourth of the screen protrudes from the edge of the bounding rectangle 84. In other words, it is allowed in some cases to view the bounding rectangle 84 from higher position and the surrounding area of the bounding rectangle 84 is included in the field of view. Therefore the link boundary 92b where the "max_overshoot" parameter is 0.25 forms a shape higher than the link boundary 92a.

In a similar manner, as the "max_overshoot" increases (0.5, 0.75, and 1.0), the shape of the link boundary varies in a way shown as link boundary 92c, 92d, and 92e, respectively. That is, as the viewpoint is at a higher position, the bounding rectangle 84 is more likely to be included in the screen. That is, by allowing an additional amount of protrusion of the screen, the range of viewpoints that satisfy the condition expands more at a higher position. Thus, the link boundary forms a broadening shape as the viewpoint is at a higher position. In this way, the introduction of the "max_overshoot" parameter can provide a boundary indicating the validity/invalidity of the link with respect to the change in appearance of the bounding rectangle and consequently with respect to the change in appearance of an area where a link is defined, wherein the change in appearance is caused by the movement of the viewpoint in a three dimensional space including the vertical direction.

In case of manipulating the analog stick 27a or the like of the input device 20 in order to move the display area in the horizontal and vertical direction, the moving distances of the image differ depending on the height of the position of the viewpoint. The "max_overshoot" parameter allows the region where the link is set valid to vary readily in accordance with the height of the viewpoint, which enables the operation that takes the height of the viewpoint into consideration.

Figure 15:
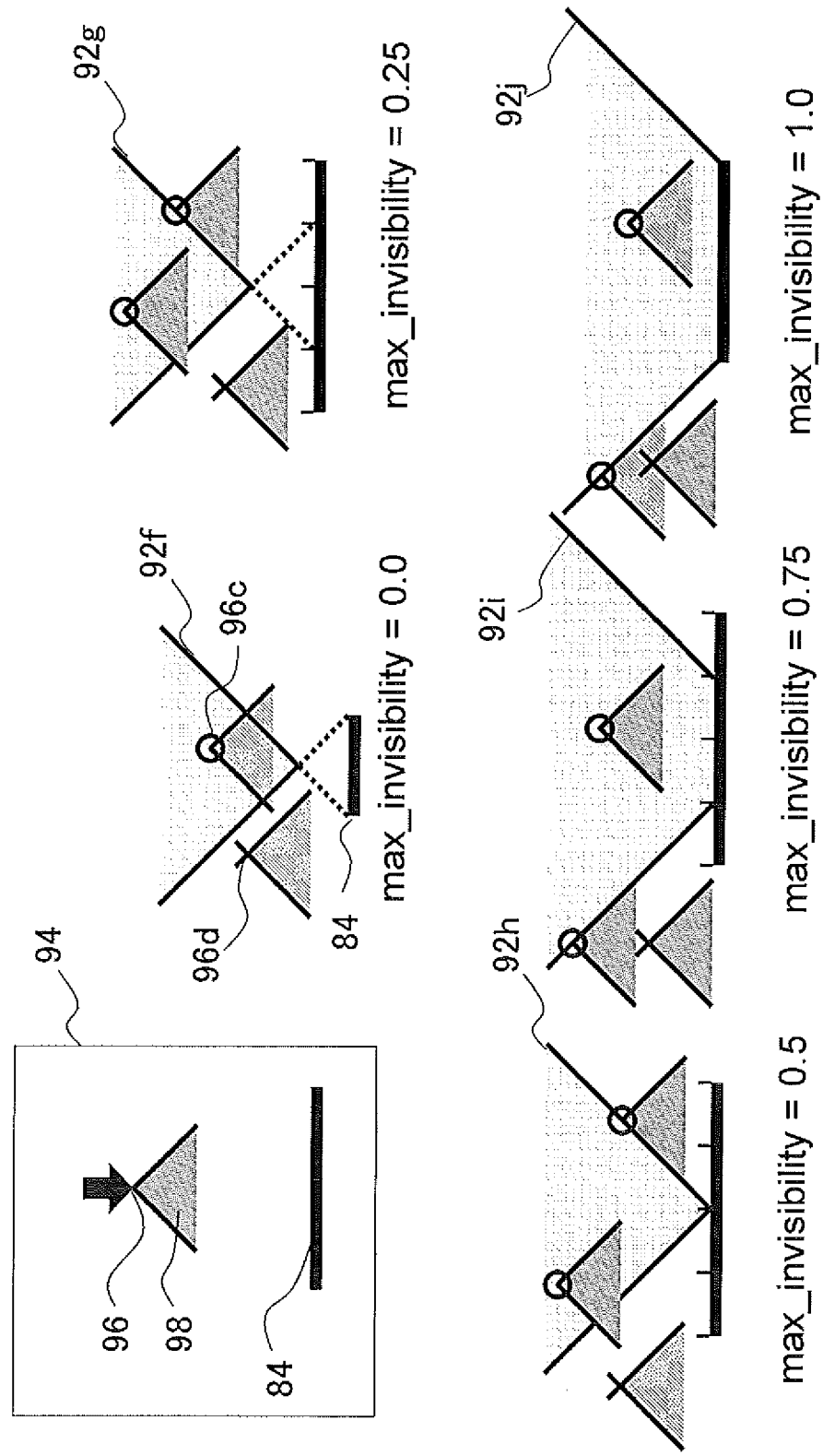
FIG. 15 shows the variation of the link boundary when a "max_invisibility" parameter is varied according to the first embodiment.

FIG. 15 shows the variation of the link boundary when the "max_invisibility" parameter is varied. The FIG. 15 is represented in a similar way as that of FIG. 14. First, assume a case where the "max_invisibility" is "0.0," i.e., where the parameter is defined so that the bounding rectangle does not protrude from the edge of the screen. Since the bounding rectangle is included in the downside region of the bottom of the triangle representing the field of view (i.e., the screen), the bounding rectangle does not protrude from the edge of the screen for the viewpoint 96c. Thus, the viewpoint 96c is in the link boundary. Meanwhile, in case of the viewpoint 96d, the bounding rectangle 84 protrudes from the downside area of the bottom of the triangle that represents the field of view, i.e., the area surrounding the bounding rectangle is also included in the screen. Therefore, the viewpoint 96d is at outside of the link boundary.

The "max_invisibility" parameter is, in a similar manner with the "max_overshoot," parameter a parameter for validating the link when the bounding rectangle is within the screen. However, the variation of the range of the link boundary versus the variation of the height of the viewpoint differs from that of the "max_overshoot" parameter. For example, in case that the "max_invisibility" is "0.0," a viewpoint at lower position leads to zooming in too closely to the bounding rectangle 84, and thus results in the bounding rectangle protruding from the screen. Therefore, such viewpoints are not included in the link boundary. In contrast, a viewpoint at a higher position reduces the likelihood of protrusion of the link boundary from the screen. Therefore, the region of the viewpoints bounded by the link boundary becomes broader at a higher position.

By considering in this way, the link boundary of a class of viewpoints that meet the condition that the "max_invisibility" parameter equals "0.0" forms a shape like that of the link boundary 92f. Similar considerations also apply to cases where the "max_invisibility" parameter equals 0.25, 0.5, 0.75, and 1.0, respectively. As the "max_invisibility" parameter increases (0.25, 0.5, 0.75, and 1.0), since an protrusion of the bounding rectangle 84 from the screen is allowed also for lower viewpoints, the breadth of the link boundary becomes broader. Thus the shape of the link boundary varies as shown as link boundary 92g, 92h, 92i, and 92j.

According to the embodiment, the viewpoint can be moved freely in the three-dimensional space including the height direction as far as the viewpoint is within a predefined region. Therefore, it happens sometimes that the display area is moved in the horizontal direction while being displayed with a large enlargement scale. In such operation, in case the screen enters, by chance, in an area where an embedded object is defined, a moving image might be played back or a screen of a store link might be displayed at a time when not intended to. The ratio of a protruded part of the bounding rectangle from the screen works as an indicator for determining whether or not the screen is intentionally positioned on the bounding rectangle by the user.

When the user desires to allow the embedded object to activate, the user usually positions the screen on the bounding rectangle intentionally. Therefore, the "max_invisibility" parameter is introduced for defining the link boundary of an embedded object. On the other hand, since the switching of an image to an image in a different set of hierarchical data is preferably performed seamlessly even for the movement of viewpoint in the horizontal direction in a large enlargement scale, the "max_overshoot" parameter is effective.

Figure 16:
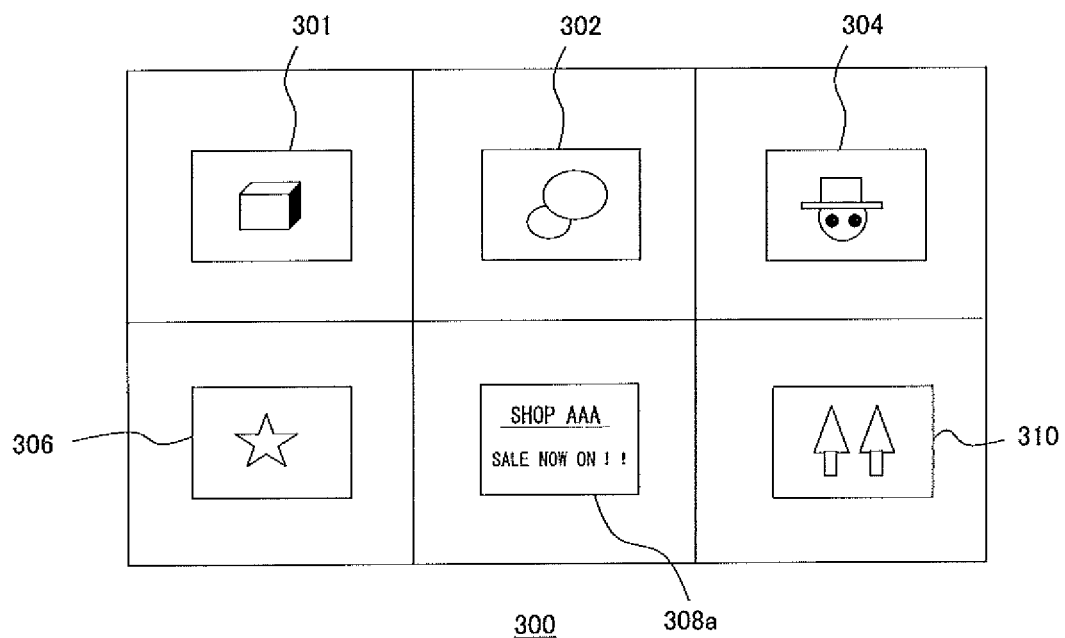
FIG. 16 shows an example of an image displayed on a display device by the information processing device according to the first embodiment.

Next, an explanation will be given on the operation of the information processing device 10 configured as described above. FIG. 16 shows an example of an image displayed on the display device 12 by the information processing device 10. The display image 300 is, for example, an initial image of content. The content can be a various kinds of content, for example, software such as a game, content for displaying a promotion of music, movie, or the like, content for a virtual department store comprising stores on the network, content for a virtual library displaying the contents of a book, a combination thereof, or the like.

By defining in the definition file the display image 300 as the home position, the image is set as the initial image. In the display image 300, six links (i.e., options) of rectangular areas 301, 302, 304, 306, 308a and 310 are defined. The type of the link may be either a switching of the display image to an image in a different set of hierarchical data, or an embedded object. The target rectangles are set for respective links in the definition file so that the target rectangles circumscribe the respective rectangular areas. The bounding rectangle and the link boundary are also defined as described above although not explicitly indicated in the display image 300.

User moves the viewpoint by using the input device 20 while watching the display image 300 and zooms in to a rectangular area that interests the user. When the viewpoint enters into a link boundary defined for the rectangular area, a process (e.g., the switching of the hierarchical data, the operation of an embedded object, or the like) corresponding to the rectangular area is performed.

Figure 17:
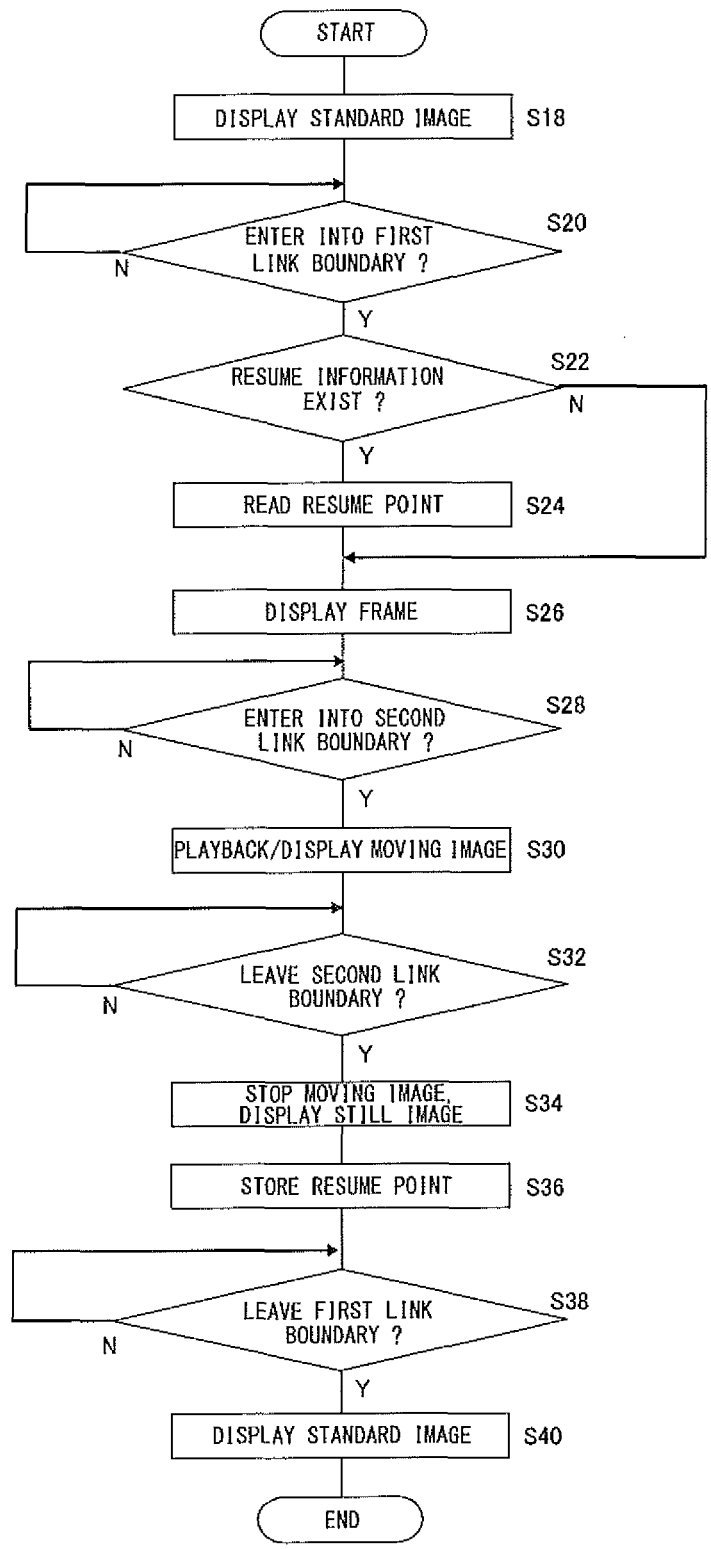
FIG. 17 is a flowchart showing the steps of the process of playing back a moving image as an embedded object according to the first embodiment.

FIG. 17 shows the steps of the process of playing back a moving image as an embedded object. According to the example of the definition file shown in FIG. 12, an object for playing back a moving image is executed in two stages. That is, a stage for playing back a certain frame as a still image, and a stage for playing back a moving image. The link boundary defined for the playback of the still image is referred to as a "first link boundary," and the link boundary defined for the playback of the moving image is referred to as a "second link boundary." First, in a state where the viewpoint is outside of the first link boundary, a standard image determined in advance, such as a title image of the moving image, an advertisement, or the like, is displayed (S18). This standard image is a part of the hierarchical data of the image being currently displayed, such as an initial image or the like, and corresponds to the image of the rectangular area 301 or the like in the display image 300 of FIG. 16.

In this state, the link determining unit 116 monitors whether or not the viewpoint enters into the first link boundary (S20). If the user operates the input device 20 and if the viewpoint enters into the first link boundary (Y in S20), the object execution unit 117 is notified thereof, and the object execution unit 117 refers to a predefined area of the main memory 60 and checks whether or not information indicating that the resume is required exist (S22). In case that the same moving image has been played back before, the point of suspension has been stored in the main memory 60 as the resume point. If the information exists (Y in S22), the information is read out (S24). If the information indicating that the resume is required does not exist (N in S22), the first frame of the moving image data read from the main memory 60 is rendered and displayed on the display device 12 as a still image. If the resume information exists (Y in S22, S24), the frame of the resume point is rendered and displayed on the display device 12 as a still image (S26).

In parallel to this processes, the link determining unit 116 monitors whether or not the viewpoint enters into the second link boundary (S28). If the viewpoint enters into the second link boundary (Y in S28), the object execution unit 117 starts the play back and the display of the moving image (S30). Also in this process, if the resume point is read out in the step S24, the moving image is played back from the point. Alternatively, at a previous stage where the viewpoint has not yet entered into the second boundary, the process for playing back the moving image may be started speculatively while displaying the still image. In this way, the moving image can be displayed smoothly when the viewpoint enters into the second link boundary at step S28.

In parallel with the displaying of the moving image, the link determining unit 116 monitors whether or not the viewpoint leaves the second link boundary (S32). If the viewpoint goes out of the second link boundary (Y in S32), the object execution unit 117 suspends the playback of the moving image and displays the suspended frame as a still image (S34). Further, the object execution unit 117 stores the suspended point as the resume point into the main memory 60 (S36). Further, the link determining unit 116 determines whether or not the viewpoint leaves the first link boundary (S38). If the viewpoint goes out of the first link boundary (Y in S38), information thereof is notified to the display area determining unit 104 and an image from the previous hierarchical data (e.g., a standard image such as the title image displayed at step S18 or the like) is displayed (S40). According to the operation described above, a mode where the playing back of a moving image in response to the zooming in to an area where a link is defined, while switching a display in two stages, can be implemented.

In practice, the link determining unit 116 constantly monitors the position of the viewpoint and determines whether the viewpoint is at inside or outside of a defined link boundary. Thus, for example while displaying a certain frame in step S26, in case that the viewpoint leaves the first link boundary without entering into the second link boundary, the process shifts to the step S40 of displaying of the standard image.

Similar steps of processing are performed for the play back of sounds. In this process, one link boundary maybe provided and switching merely between playback/non-playback of sounds may be performed in a similar manner as shown in the example of definition file of FIG. 12. Alternatively, a plurality of stages maybe provided so as to switch between audio data to be played back, sound volumes, or the like. In addition, in case a sound is played back as a BGM even when the image shown in FIG. 16 is displayed, cross-fade process may be applied when switching sounds.

For both of moving image and sound cases, if a same moving image or a same sound is played back at a plurality of areas where an embedded object is defined, the resume point may be set as common information. For example, By zooming in to any one of the rectangular area 301-310 in the display image 300 of FIG. 16, a same music is played back. In addition, the resume point is set commonly to the areas. In this way, the continuity of music can be maintained and a feeling of consistency can be produced, regardless of which rectangular area is in focus.

Whether or not to resume, or whether or not to set the resume point as a common point, may be defined by a user or a creator of content for respective embedded objects. Further, when displaying a certain frame at step S26 of FIG. 17, the frame may be displayed so that the frame and the standard image having been displayed at the rectangular area cross-fade. In a similar manner, in case that the viewpoint is moved to a neighboring rectangular area, the still images or the moving images being displayed may be cross-fade.

Figure 18:
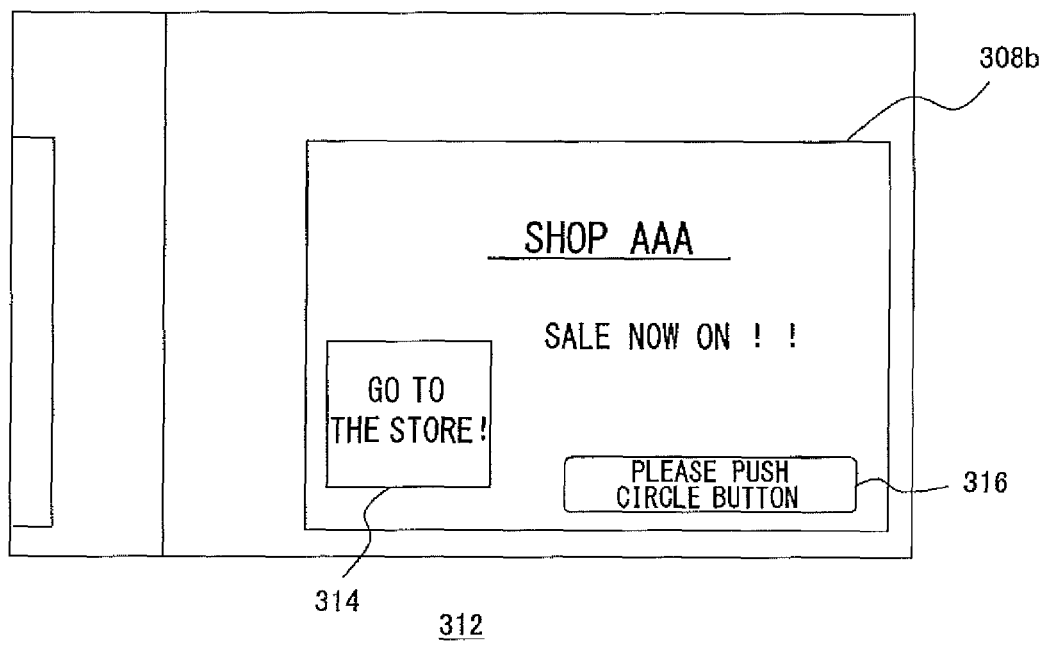
FIG. 18 shows an example of an image to be displayed when allowing a store link to operate as an embedded object according to the first embodiment.

FIG. 18 shows an example of an image to be displayed when allowing the store link to operate as an embedded object. The display image 312 represents an image displayed when the viewpoint enters into the link boundary defined for the rectangular area 308a for which a store link is defined among the images in the display image 300 of FIG. 16. By setting the attribute "action" in FIG. 12 as "show_link", the object execution unit 117 switches the image of the rectangular area 308a of FIG. 16 to the rectangular area 308b of FIG. 18 when the viewpoint enters into the link boundary.

In the image of the rectangular area 308b, the indicator 314 and the indicator 316 are displayed in addition to the store information having been displayed from the beginning. The indicator 314 states, "Go to the store," and indicates that it is possible to move to the website of the store. The indicator 316 states, "Please push the circle button," as an operation method for determining the movement. Details of an image to be added and the arrangement thereof are determined as appropriate while considering the design, the input device, or the like. For example, the indicator 314 may be already displayed at the stage of the display image 300 and when the rectangular area 308a is zoomed in, only the color of the indicator may be changed so as to indicate to the user that the move to the link destination is possible.

The user zooms in the rectangular area 308a until the area is displayed at a size permitting the displacement to the link destination, and when the displayed image is switched to the image of the rectangular area 308b, the user allows the website screen of the store to be displayed by pressing the "circle button" or the like of the input device 20 in accordance with the display of the indicator 316. Commonly used technology may be applied for accessing the websites or for displaying.

The rectangular areas 301-310 of the display image 300 in FIG. 16 can be construed as "options" for which some sort of link is defined. Thus, in accordance with the definition of the selection acknowledging display shown in FIG. 12 as an example, the areas may be displayed with emphasis, by for example changing the colors of the rectangular areas 301-310 at a certain time so as to indicate that the areas are the options. The time for displaying with emphasis maybe when the viewpoint enters into the predefined link boundary or may be when a predetermined input is made via the input device 20.

By explicitly indicating the options in the image displayed on the screen and by acknowledging the operation for selection by the user, the user can select a desired rectangular area effectively. Further, by allowing the automatic movement of the viewpoint (e.g., moving the selected rectangular area to the center of the screen, zoom-in to the selected rectangular area, or the like), the user can reach in a moment to the point of switching of hierarchical data, or to the starting processes of an embedded object, with a minimum operation.

Although these operations allow a user to select a rectangular area and to shortcut towards the direction of enlarging the scale factor of an image, bi-directional shortcuts along with the scale factor may be executed. For example, after automatically zooming in the rectangular area selected by the user, upon manipulating a predefined key, such as the cross button 23 of the input device 20, the enlargement scale factor is reduced and the display is returned back to the previously displayed image. This enables an increase in the efficiency of operation, for example in case that the user desires to select another rectangular area.

In this case, every time an input for selection is made, the object execution unit 117 stores parameters representing the display area, such as current frame coordinate, or the like, into the main memory 60. In case the user provides an input for returning the display back, the object execution unit 117 reads parameters representing the previous display area from the main memory 60 and notifies the display area determining unit 104 thereof, by which, the area is displayed. In case a plurality of inputs for selection is made, for example in case that descendants options are provided, parameters representing the display areas at the time points of selections are stored sequentially and are read out using LIFO (Last In First Out) method. Hereinafter, the list of parameters that are stored in this manner is referred to as "breadcrumb list."

Figure 19:
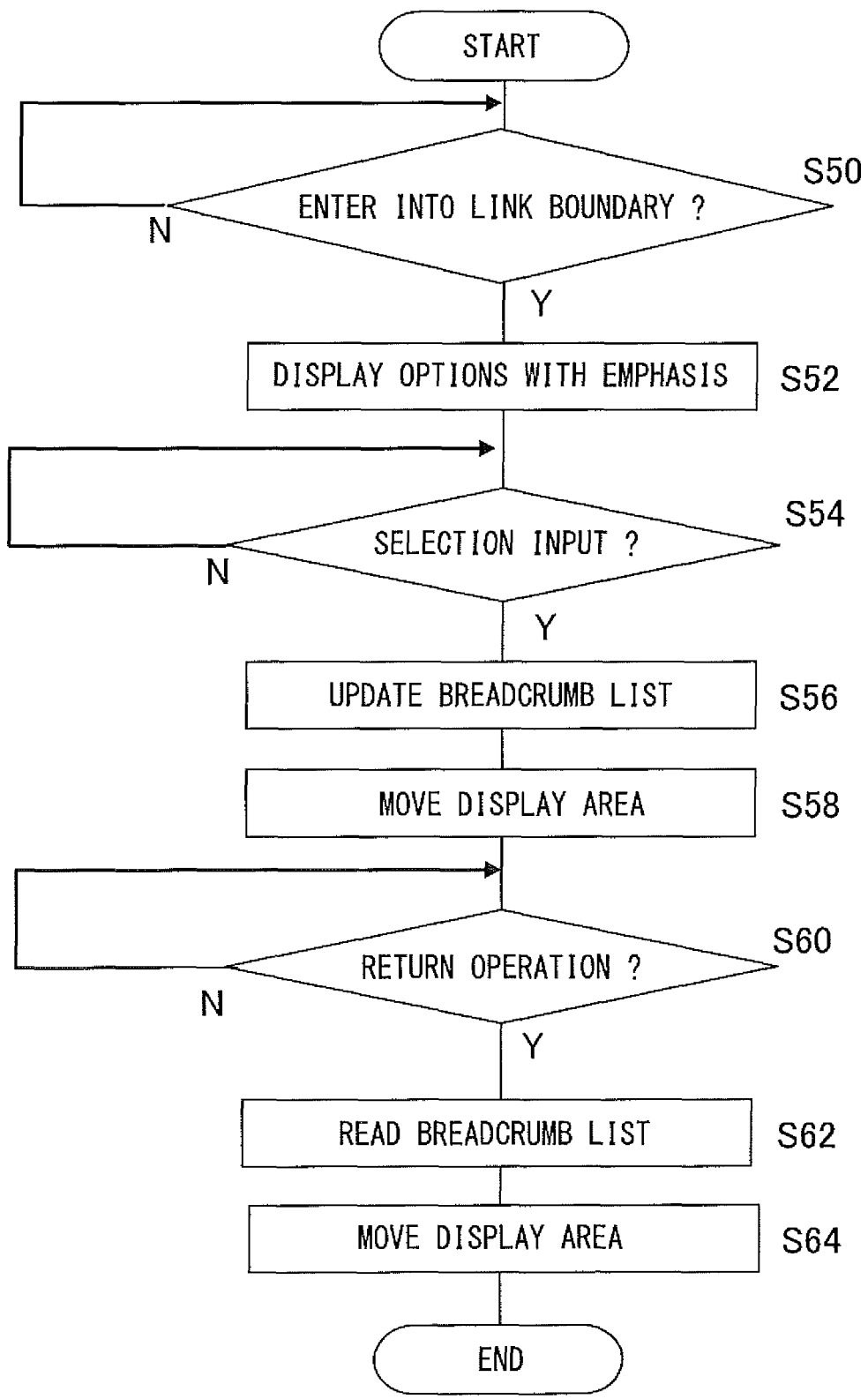
FIG. 19 is a flowchart showing the steps of the process of the information processing device according to the first embodiment, in case the device performs a process on a selection acknowledging display as an embedded object.

FIG. 19 shows the steps of the process of information processing device 10 in case a process of selection acknowledging display is performed as an embedded object. First, while the display image 300 shown in FIG. 16 is displayed, the user moves the viewpoint while using the input device 20. In this process, the link determining unit 116 monitors whether or not the viewpoint enters into the link boundary for displaying with emphasis (S50). If the viewpoint enters into the link boundary (Y in S50), the object execution unit 117 displays the rectangular area 301-310 with emphasis in accordance with the setting of the definition file, for example by changing the colors of the areas or the like (S52). Then the object execution unit 117 waits for the user to press down a key indicating a direction (e.g., the directional keys 21 or the like) and a determination button (e.g., the circle button 22 or the like) of the input device 20 so that one of the rectangular areas is selected (S54).

If the selection is inputted (Y in S54), the object execution unit 117 writes the parameters regarding the display area at that time point in the breadcrumb list in the main memory 60 (S56). By notifying the display area determining unit 104 of the information on the movement of the viewpoint defined in the definition file, the object execution unit 117 moves the display area, for example, allowing to zoom in the selected rectangular area (S58). In this step, not only the displacement of the display area, but also a certain process defined while associating with the angular region may be performed. As an example of the certain process, an image for an explanation or an advertisement regarding the selected area may be displayed additionally, or the colors may be changed. Data for the image to be displayed additionally is included in the content in association with the rectangular area. In case that the user thereafter instructs to move the viewpoint, for example, to further zoom in the area or the like, a process in accordance to the instruction is performed as appropriate, although not shown in FIG. 19.

If the user input an instruction for returning the display area back by manipulating a predefined key such as the cross button 23 of the input device 20 (Y in S60), the object execution unit 117 reads out a parameter that is recently written from the breadcrumb list of the main memory 60 (S62), and notifies the display area determining unit 104 thereof, so as to move the display to a display area determined by the parameter (S64). Such operation enables, in case that the user indicates an explicit intention by inputting his/her selection, to display while highly valuing the efficiency.

Marking not only the display area of the home position but also another display area, in response to the input selection from the user, enables one to avoid an inefficient situation, such as, the user loses the destination of the movement because of an image displayed in a high enlargement scale factor, etc., or the user has to re-start the operation from the beginning. As a result, degrees of freedom for method of inputting increases and the user can reach to desired information effectively even if options are provided in a deep hierarchical structure.

Figure 20:
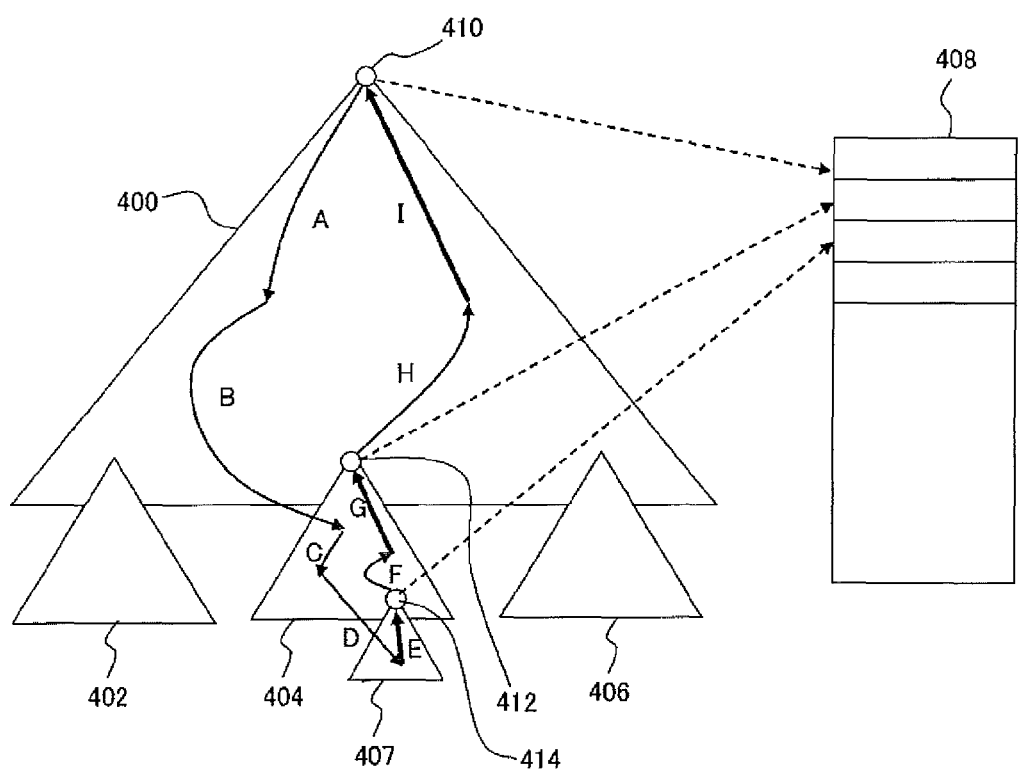
FIG. 20 illustrates a process of moving a display area back when a viewpoint is moved arbitrarily according to the first embodiment.

Although the operation of FIG. 19 is regarding the selection acknowledging display, the process of returning the display area back may be performed independently of the selection acknowledging display. For example, the display area determining unit 104 marks the point to be returned back along with the process of switching of the hierarchical data. FIG. 20 illustrates a process of returning the display area back when the viewpoint is moved arbitrarily. The figure is represented in a similar manner as that of FIG. 6, and links are set for the hierarchical data set 400 to the hierarchical data sets 402, 404 and 406. Further, a link is set for the hierarchical data set 404 to the hierarchical data set 407. In a content for displaying such an image data, the information of an image 410 of the home position is stored in the breadcrumb list 408 of the main memory 60. The information to be stored may be a frame coordinate, identification information of the hierarchical data, or the like.

It will be assumed that the user moves the viewpoint in the virtual space as shown with an arrow A and an arrow B by using the analog sticks 27a, 27b of the input device 20, and the viewpoint enters into the region of hierarchical data set 404. If the display image is switched to that of the hierarchical data set 404 accordingly, information on image 412 on the layer of lowest resolution, which is, so to say, the home position of the hierarchical data set 404, is additionally written into the breadcrumb list 408. If the user moves the viewpoint as shown with an arrow C and an arrow D, and the viewpoint enters into the region of the hierarchical data set 407, information on image 414 on the layer of the lowest resolution of the hierarchical data set 407 is additionally written into the breadcrumb list 408.

If the user inputs an instruction for returning the display back, the latest image information is read out from the breadcrumb list 408 in the LIFO method and the viewpoint is moved as shown with an arrow E. In this process, the viewpoint may be literally "moved" while showing the path thereof, or the display images are switched immediately. This gives the user options to switch the display to the hierarchical data set 404, or to move the viewpoint in the hierarchical data set 407. According to the example shown in FIG. 20, after the image 414 is displayed, the user switches the display to the hierarchical data set 404 by, for example, reducing the image, etc. (arrow F).

Upon inputting an instruction again for returning the display back, the information on the image 412 is read out from the breadcrumb list 408 and the viewpoint is moved as shown with an arrow G. If the user further reduces the image, moves the viewpoint in images of the hierarchical data set 400 as shown with an arrow H, and then inputs an instruction for returning the display back, the information on the image 410 is read out from the breadcrumb list 408 and the viewpoint is moved as shown with an arrow I.

Such operation enables, regardless of how the user moves the viewpoint in a same set of hierarchical data, to display an image having the lowest resolution in the same hierarchical data merely by inputting the instruction for returning the display back. An image of lowest resolution is an image that provides a broad view of the entirety of the hierarchical data and, at the same time, is an image capable to change the display to an immediate upper hierarchical data set. The user can reduce the scale factor of a displayed image in short steps, to an images determined in a unified way for respective sets of hierarchical data, without his/her train of thought being interrupted by a significant change of images, e.g., without being brought back to the initial image straight away, etc. Therefore, the user can reach to a desired area efficiently without losing sight of the destination of the move. In addition, the user can bring the viewpoint back while roughly tracing the movement history of the viewpoint. For example, the user can move the viewpoint back to the second previous hierarchical data set by inputting two consecutive instructions for returning back.

Although in the example shown in FIG. 20, the information on the image having the lowest resolution in each hierarchical data set is stored as the breadcrumb list, this is not nonrestrictive as long as one reference display area having the lowest resolution is determined for each range of the viewpoint. For example, a plurality of reference display areas may be determined in a same set of hierarchical data. Also in this case by writing, if the viewpoint enters into a new area, information relating to a reference display area corresponding to the new area into the breadcrumb list, a similar mode is implemented. This mode may be combined with the mode shown in FIG. 19 where the options are displayed with emphasis. In this case, information on the display area at the time point when a selection is inputted is also stored as a returning back destination, in addition to the information on the images 410, 412 and 414.

According to the embodiment described above, the movement of the viewpoint including the enlargement/reduction of a display image triggers a process, such as, the switch of the display to another hierarchical data set, the playback of a moving image, the playback of a sound, the link to another site in the network, the display of the options with an emphasis, etc. In this way, the user can allow the information processing apparatus to perform a desired process with the movement of the viewpoint (in other words, with an intuitive and easy operation), while enjoying an image. Further, aforementioned multi-functional content can be created with simple definition in the definition file.

Focusing attention to the viewpoint with respect to an image enables the definition on detailed setting by using the position of the viewpoint, which allows not merely a binary determination of the selection/non-selection of functions, but also multi-staged processes. By acquiring the ratio of apart of the screen that protrudes from the rectangular area, the ratio of a part of the rectangular area that protrudes from the screen, etc., desired process can be performed at an appropriate time based on the content of respective processes. Performing a process such as cross-fading or the like when switching processes enables the seamless connection between images or between sounds before and after the switch. This allows a user to try the playback of a moving image casually as a continuation from displaying an image. These allow to implement excellently designed, and user-friendly content, compared with the case where a process is selected by using a cursor.

Further, by displaying options with emphasis and by enabling the selection of an option, a mode based on the needs or the situation of a user can be implemented without significantly changing the appearance even when the user desires to operate directly. Regardless of whether or not such direct selection is made, a display area having a lower resolution than that of an image being displayed concurrently is stored as the display area of a returning back destination so that the user can return back to the area directly by predefined operation via the input device. This enables a smooth movement within images, and as a result, an increased efficiency in reaching to a desired area.

Second Embodiment

The embodiment is implemented with a similar information processing apparatus and hierarchical data as those explained while referring to FIGS. 1 to 6 according to the first embodiment. An explanation will be given below while focusing on points different from that of the first embodiment.

Figure 21:
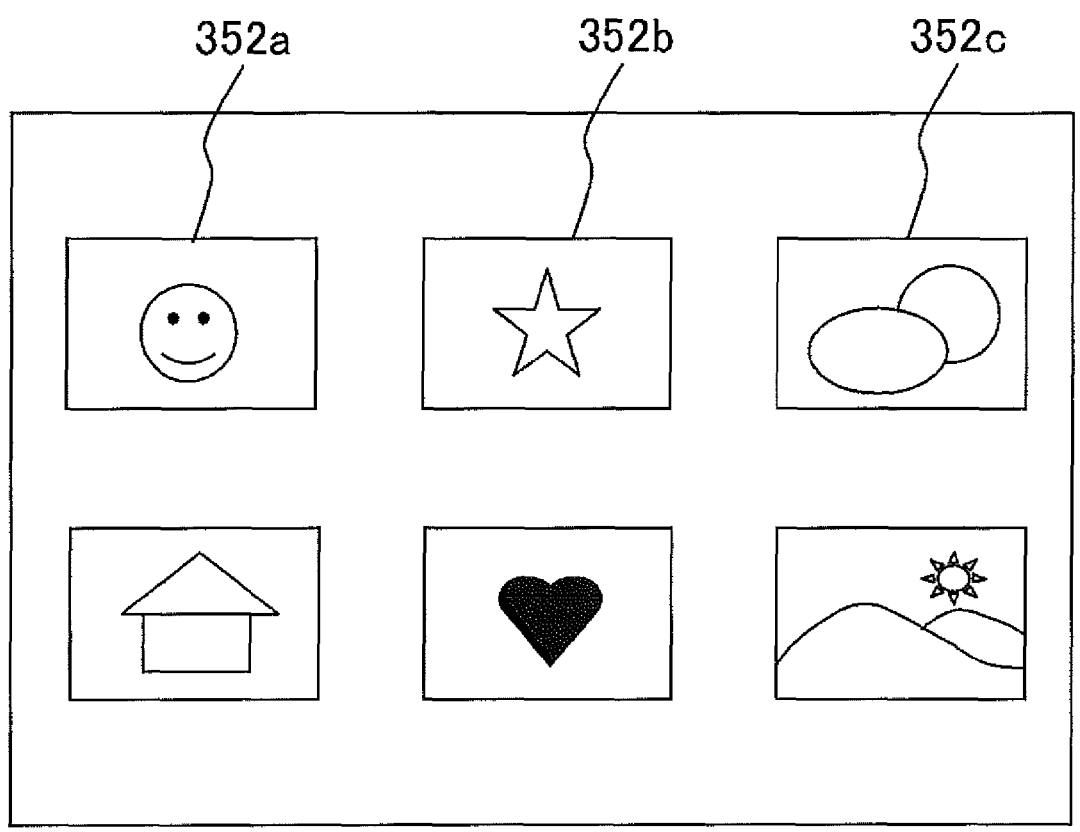
FIG. 21 shows an example of an image in which a link is defined according to the second embodiment.

FIG. 21 shows an example of an image displayed on the display device 12 by the information processing device 10 according to the present embodiment, wherein a link is defined in the image. In a display image 350, a plurality of link areas, such as, a link area 352a, 352b, 352c, or the like, are defined. For example, the user zooms in to the link area 352a while the display image 350 is set as an initial image, a corresponding process (e.g., switching the sets of hierarchical data used for the creation of the image, execution of the embedded object, or the like) is performed accordingly, at the time point when the link area 352a is displayed on the entire screen. For this purpose, a definition file is created in association with a set of hierarchical data. The definition file associates the frame coordinate in the virtual space shown in FIG. 3 when the link area 352a is displayed on the entire screen, the identification information of the process to be processed for the link, and the identification information or the address of data necessary for the process (e.g., moving image data, a program, or the like).

According to such a mode where the images are switched or an embedded object is executed, triggered by the movement of the viewpoint into the link boundary, a user is allowed to feel the continuity from the original image, and content with an excellent design in a variety of manners can be implemented, being comparing with the case where the selection is made from a list of options by manipulating a pointing device. In this manner, when it is necessary to zoom in to a specific area, the user performs an enlargement operation while adjusting the position in the horizontal planar direction while using the input device. It is favorable to simplify such operation as much as possible.

In an example shown in FIG. 21, since the link area 352a, 352b, 352c, or the like are arranged in order while separately positioned, it is easy to recognize the region of each link area. In contrast, link areas may be defined in an image that is continuous as a whole, for example a piece of picture, a piece of photograph, or the like. In such case, the range of the link area is not easy to recognize, which leads to a further trouble for adjusting the position of the screen to a link area. Therefore, according to the embodiment, while a user manipulates to enlarge the display, a fine adjustment is added so that the screen is guided to the link area by which, the user input is supported. An area that is the guided destination may not necessarily be the link area and may be an area to which the creator of the content would like to guide the viewpoint intentionally, or the like. However, an explanation will be given below on an example with the link area.

Figure 22:
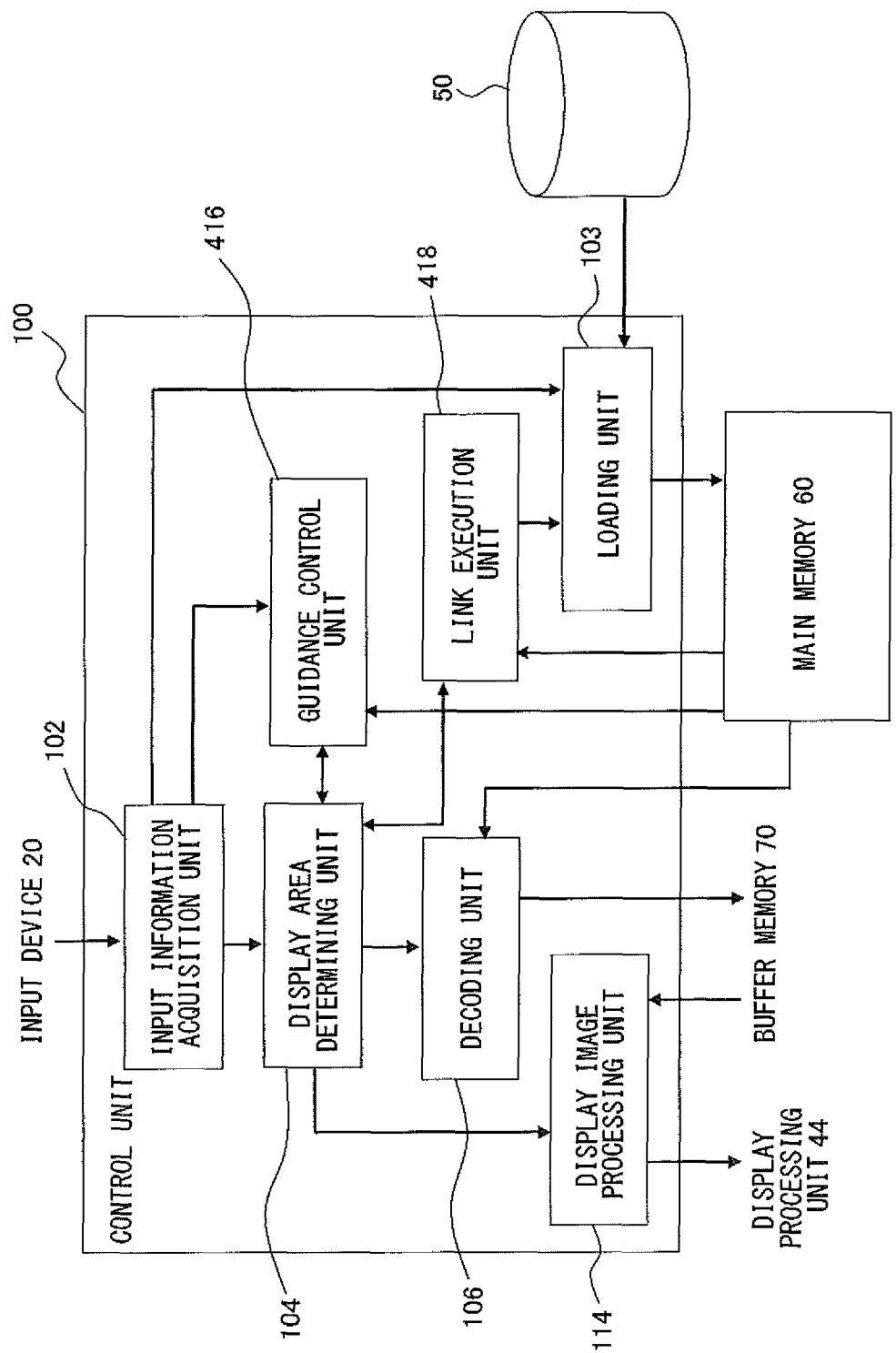
FIG. 22 shows in detail the configuration of the control unit according to the second embodiment.

FIG. 22 shows in detail the configuration of a control unit 100 according to the embodiment. In a similar manner with the first embodiment, the control unit 100 comprises an input information acquisition unit 102 that acquires information entered by the user via the input device 20, a loading unit 103 that loads a set of hierarchical data to be displayed from the hard disk drive 50, a display area determining unit 104 that determines a display area in accordance with the entered information, a decoding unit 106 that decodes compressed image data, and a display image processing unit 114 that renders a display image. The control unit 100 further comprises a guidance control unit 416 that corrects the display area determined by the display area determining unit 104 so that the screen is guided to the link area, and a link execution unit 418 that applies a process defined for the link area.

The elements depicted in FIG. 22 as functional blocks for performing various processes are implemented in hardware such as a central processing unit (CPU), memory, or other LSI's, and in software such as a programs etc., loaded into the memory. As describe above, the control unit 100 includes one PPU and a plurality of SPUs. The PPU and the SPUs form the functional blocks alone or in combination. Therefore, it will be obvious to those skilled in the art that the functional blocks may be implemented in a variety of ways, by hardware only, software only, or a combination thereof.

In the hard disk drive 50, a content file including hierarchical data, and a definition file. In case of displaying image data comprising a plurality of sets of hierarchical data where a link is defined, a plurality of sets of hierarchical data and definition files corresponding to respective sets thereof are stored.

As necessary, the content file may further include data necessary for the processing of the embedded object, such as moving image data, an application program or the like.

In accordance to the operation of the user via the input device 20, the input information acquisition unit 102 acquires information on a request for the start/completion of content, the displacement of the viewpoint, etc., from the input device 20 and notifies the loading unit 103, display area determining unit 104 and the guidance control unit 416 of the information. Upon being notified from the input information acquisition unit 102 that the request for starting content is made, the loading unit 103 reads the hierarchical data of an initial image of the content and definition file thereof from the hard disk drive 50 and stores into the main memory 60. As necessary, the loading unit 103 further reads hierarchical data of the destination of the displacement of the viewpoint, data necessary for the execution of the embedded object, or the like from the hard disk drive 50 and stored the data into the main memory 60.

Upon being notified by the input information acquisition unit 102 that the request for moving the viewpoint is made, the display area determining unit 104 transforms the distance of the displacement of the viewpoint into the coordinate in the virtual space of the hierarchical data, and determines the frame coordinate of the destination of the move, which is to be displayed. While the viewpoint is within a predetermined area with respect to the link area defined in the definition file, the guidance control unit 416 corrects the frame coordinate determined by the display area determining unit 104 so as to guide the screen to the link area. The guidance is performed, during the period when the user requests to move the viewpoint via the input device 20, as a fine adjustment for the request. A detailed description will be given later.

The decoding unit 106 reads a part of compressed image data from the main memory 60, decodes the data and stores the decoded data into the buffer memory 70. The data that the decoding unit 106 decodes may be image data of a predetermined size including the display area. By decoding a wide area of image data and storing the decoded data into the buffer memory 70 in advance, the number of read accesses to the main memory 60 can be reduced and the viewpoint can be moved smoothly. The display image processing unit 114 acquires the frame coordinate of the area to be displayed determined by the display area determining unit 104, reads corresponding image data from the buffer memory 70, and renders the data into the frame memory 76 of the display processing unit 44.

The link execution unit 418 refers to the definition file that is stored into the main memory 60 and is associated with the hierarchical data set being currently displayed, and in case that the viewpoint of the destination of the move meets the condition for the link, applies the predefined process to the link area. The condition for the link may be the range of the viewpoint when the link area is displayed on the entire screen as described above, or may be the range of the viewpoint when a predetermined ratio of the link area is within the screen, etc. Further, a threshold value may be set for the enlargement scale factor, or the like. These conditions are defined by the creator of the content, or the like, while considering the arrangement of link area, or the like.

In case the programs or data for executing the embedded object is not stored in the main memory 60, the link execution unit 418 issues to the loading unit 103 a request for loading from the hard disk drive 50 to the main memory 60 with the identification information of the program or the data.

Also in the case of switching the display to that of another hierarchical data set, a request for loading is issued to the loading unit 103. Further, link execution unit 418 issues a request for switching of the hierarchical data sets to the display area determining unit 104. In response to the request, the display area determining unit 104 transforms the frame coordinate with that of the hierarchical data of after the switch, and notifies the decoding unit 106 of the transformed coordinate with the identification information of the hierarchical data set. In response, the decoding unit 106 sets the hierarchical data of the link destination as the data to be decoded.

Next, an explanation will be given on the guidance mechanism where the guidance control unit 416 guides the screen to a link area. As described above, according to the embodiment, a link area is provided in an image and a variety of processes are implemented by positioning the screen on the area. In such embodiment, the user often repeats a zoom-in of the image by using the enlargement/reduction key (e.g. the analog stick 27b of the input device 20) and an adjustment of the position using the key indicating a direction (e.g., the directional keys 21), so that the user zooms in to the targeted area.

In such an operation, for example in case that one link area dominates a large area in the screen at a stage where the image is enlarged to a certain scale, the intention of the user to target the link area can be predicted even if the position is out of alignment to a certain degree. By utilizing this nature, which link area the user targets is predicted based on the appearance of the link areas in the screen. Then the screen is guided to the link area by applying a fine adjustment in the horizontal planar direction in conjunction with the operation for enlargement of the image.

Specifically, threshold values are defined as a guidance condition for the enlargement scale factor of the display image and the ratio of a part of link area that protrudes from the screen, respectively. The ratio of a part of link area that protrudes from the screen is the ratio of the length of the part of link area that protrudes from the screen to the width of the link area in the direction of the protrusion. In case the link area protrudes from the screen for both horizontal and vertical directions, the larger ratio is adopted. If the enlargement scale factor is above the threshold, and if the ratio of a part of a link area that protrudes from the screen is less than the threshold, it is predicted that the user targets that link area.

In such situation where a prediction can be made, if the user provides an operation for enlarging the image via the enlargement/reduction key, the enlargement scale factor of the display image is increased in response, and concurrently, the display area is moved in the horizontal planar direction so as to come close to the link area predicted to be the area being targeted. The monitoring on whether or not the guidance condition is satisfied is performed constantly during the period when the user requests to move the viewpoint. The guidance condition may be defined in the definition file described above for each link area, or may be defined commonly for all link areas. Alternatively, the condition may be defined as a parameter retained by the guidance control unit 416 independently from hierarchical data sets. Further, the guidance process may not be performed when the user executes the operation for moving in the horizontal planar direction in addition to the operation for enlarging.

Figure 23:
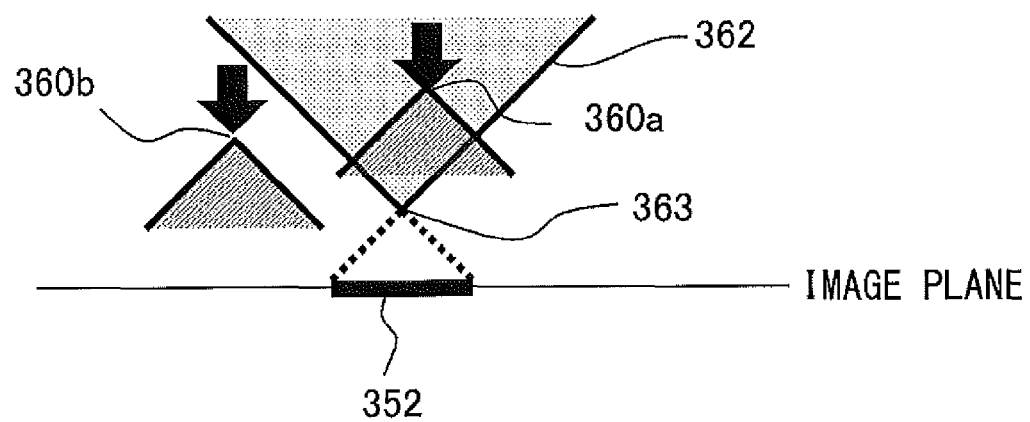
FIG. 23 shows variations of the positional relations between the link area and the screen due to the difference of viewpoint according to the second embodiment.

FIG. 23 illustrates variations of the positional relations between the link area and the screen due to the difference of viewpoint. The vertical direction of the figure represents the height of the viewpoint with respect to the image, and the line shown at the bottom represents the image plane. On the image plane, the link area 352 is represented with a thick line. First, viewing the image from the viewpoint 360a, the link area 352 is within the field of view (i.e., the screen) without protruding therefrom as seen from the triangle representing the field of view. On the other hand, viewing the image from the viewpoint 360b, a part of the link area 352 protrudes from the screen.

Since the size of the link area 352 with respect to the screen becomes larger as the viewpoint comes close to the image plane, the link area 352 has a greater likelihood of protruding from the screen. Therefore, the region of the viewpoints for which the link area 352 does not protrude from the screen has the form shown as the viewpoint region 362. Even if the threshold of the ratio of the protrusion is changed, the form of the viewpoint region remains similar as the viewpoint region 362. That is, upon determining the guidance condition as described above, the range of the viewpoint according therewith is determined like the viewpoint region 362.

In FIG. 23, the viewpoint 363 is a viewpoint with which the link area 352 is displayed just on the entire screen, i.e., the viewpoint where the process of the link is executed. The guidance control unit 416 controls the guidance of the viewpoint (i.e., the screen) while targeting to the viewpoint region 363 during the period when the user enlarges the image. The link area 352 may not be exactly the same area where the link is defined, i.e., the area where the image is switched or the moving image is displayed upon zooming therein. For example, the link area 352 may be an area including the area where the link is defined and surrounding area thereof.

Defining one guidance condition implements a binary decision mode of whether or not to guide, by determining whether the viewpoint is inside or outside of the viewpoint region determined by the guidance condition. Further, around the viewpoint region determined by the guidance condition, an intermediate viewpoint region may be provided according to the embodiment. Hereinafter, the former viewpoint region is referred to as a "guided region" and the latter viewpoint region is referred to as a "semi-guided region." When the viewpoint is within the semi-guided region, the guidance is executed with a guidance force smaller than that of the case the viewpoint is within the guided region. The "guidance force" is, for example, the ratio of the velocity of the movement in the horizontal planar direction of the image caused by the guidance against the enlargement rate of the image caused by user operation.

Figure 24:
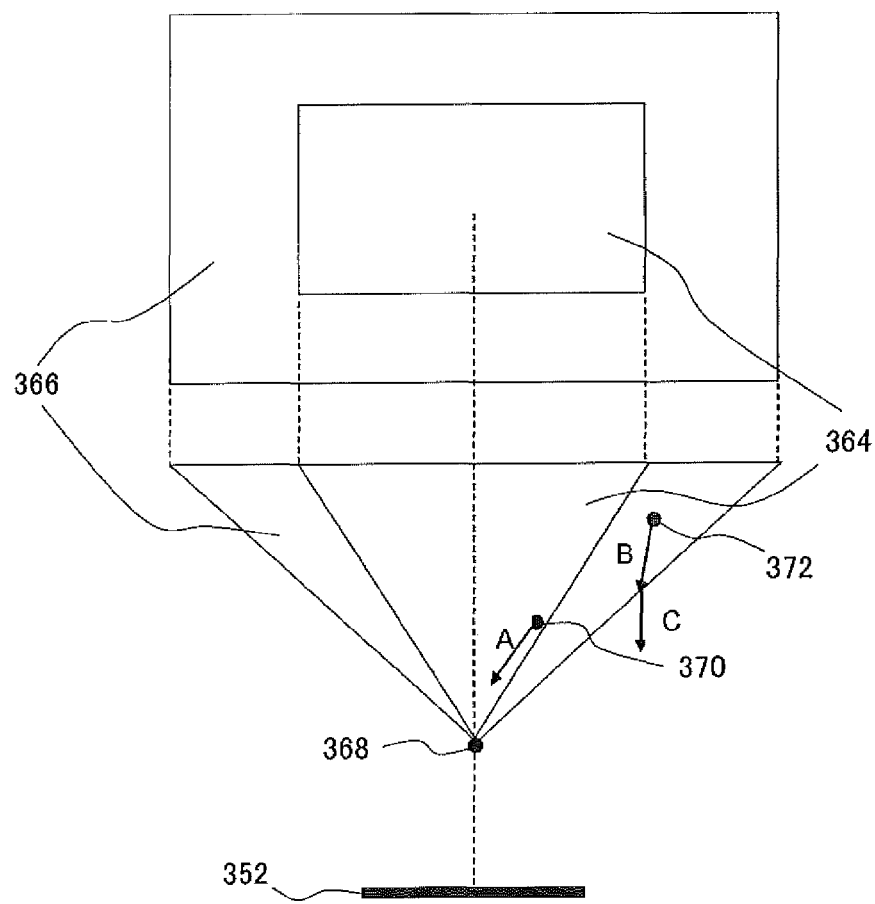
FIG. 24 schematically shows a relation between a guided region and a semi-guided region according to the second embodiment.

FIG. 24 schematically shows a relation between the guided region and the semi-guided region. The figure is represented in a similar manner to that of FIG. 23 and the link area 352 is shown in the bottom. The upper part of FIG. 24 also represents the appearance of respective regions when viewed from above. In FIG. 24, the guided region 364 corresponds to the viewpoint region 362 of FIG. 23 and the viewpoint of the target of the guidance is the viewpoint 368. At the circumference of such guided region 364, the semi-guided region 366 is defined. The semi-guided region 366 is defined, for example, as having a same centerline with that of the guided region 364 and as an area that is the extension of the guided region 364 in the horizontal planar direction but excluding the guided region 364. The guidance force of the semi-guided region and each region may be defined in the definition file for each link area, or may be defined commonly for all link areas. Alternatively, the guidance control unit 416 may retain the definition of the force independently from hierarchical data sets.

Even if the enlargement rate of the image instructed by the user is same, the velocity of the movement of the screen caused by the guidance (i.e., velocity of the movement of the viewpoint in the horizontal planar direction) varies. For example, the horizontal planar component of the amount of the movement of the viewpoint 372 per unit of time in the semi-guided region 366 (arrow B) is smaller than the horizontal planar component of the amount of the movement of the viewpoint 370 per unit of time in the guided region 364 (arrow A).

In case that the viewpoint 372 in the semi-guided region 366 strays out of the semi-guided region 366 while the viewpoint 372 is guided as shown with the arrow B and is approaching to the image plane, the guidance is canceled as shown with the arrow C and only the enlargement of the image instructed by the user operation is executed. That is, because the determination whether the viewpoint is inside or outside of respective regions are constantly executed during the period when the user operates for enlargement, the start or stop of the guidance, and the change of the guidance force are executed along with the movement of the viewpoint in real-time.

The semi-guided region is construed as an region of the viewpoint where the amount of the protrusion of the link area from the screen is larger as compared with the guided region at a same enlargement scale factor. Therefore, by providing the guided region and the semi-guided region in the aforementioned manner, the guidance force can be adjusted minutely in dependence upon the amount of the part of link area staying in the screen. As a result, uncomfortable feeling of the user caused by a guidance (e.g., strong guidance to a link area which is not targeted, switching between guidance and non-guidance caused by a slight shake of the screen, or the like) can be reduced.

Figure 25:
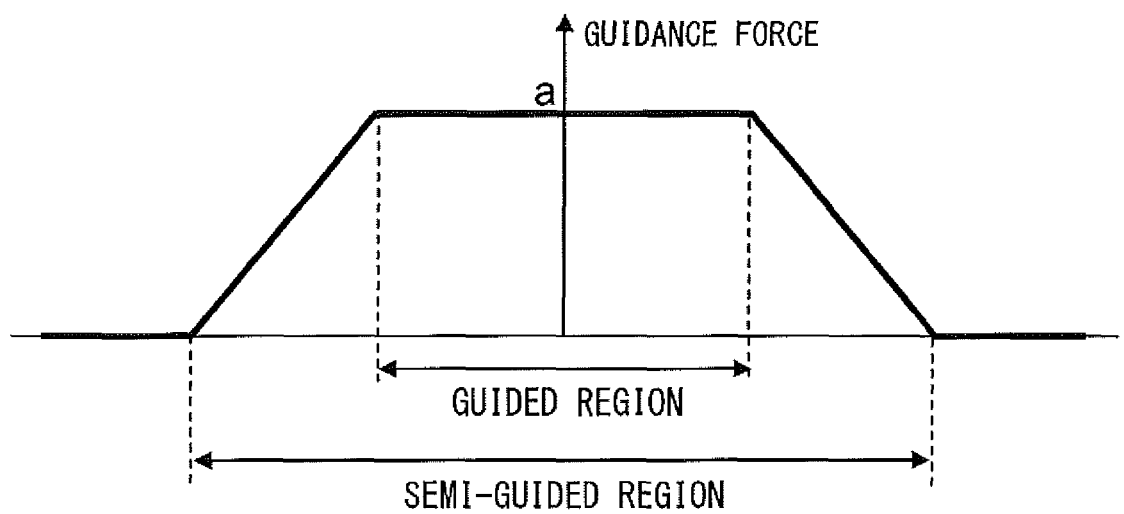
FIG. 25 schematically shows an example of the definition of guidance force versus the horizontal distance from the centerline of the link area to the viewpoint according to the second embodiment.

The guidance force may not necessarily be fixed in each of the guided region 364 and the semi-guided region 366. FIG. 25 schematically shows an example of the definition of guidance force versus a distance in horizontal planar direction from the centerline of the link area to the viewpoint. In the figure, the vertical axis represents the guidance force and the center of the horizontal axis corresponds to the centerline of the link area. In this figure, the guidance force is defined as a constant value within the guided region and defined within the semi-guided region so as to monotonically decrease in accordance with the distance from the centerline and to reach 0 at the boundary where the distance from the centerline reaches the maximum. In a similar manner, the guidance force may be defined so as to vary in accordance with the distance from the centerline, also in the guided region.

The guidance force may be defined so as to vary continuously without being divided into two regions, i.e., the guided region and the semi-guided region. Alternatively, the guidance force may be defined while being divided into more than three regions. In any of the cases, as the distance from the centerline of the link area becomes shorter, it is construed that the likelihood that the user targets the link area is higher. Therefore, by changing the guidance force in accordance with the distance, the displacement of the viewpoint of the user can be supported with a natural movement.

The guided region may be defined directly instead of providing the threshold value to the ratio of the protrusion of the link area from the screen as the guidance condition that defines the guided region. For example, by defining the rate of change of the distance from the centerline of the link area to the viewpoint against the rate of change of the height of the viewpoint, a circular conic guided region with circular cross section can be defined instead of the guided region shown in FIG. 24. The semi-guided region can be defined in a similar manner and its cross section is a hollow circular shape formed around the guided region. Also in this case, a similar effect can be obtained with a similar mechanism as that of the aforementioned explanation.

In case the guided region or the semi-guided region has a common region for a plurality of link areas, the guidance force for the viewpoint that enters into that common region may be defined as an average of the guidance force towards respective link areas weighted by the distance from the viewpoint to the centerline of respective link areas. The guidance force and the distance to the centerline are calculated as vectors and calculated for the horizontal component and the vertical component, respectively. Also in such case, the viewpoint strays out of a guided region or a semi-guided region of a link area having weak guidance force (e.g., the distance is long, or the like) in due time, and is guided to the link area nearest from the viewpoint eventually.

Figure 26:
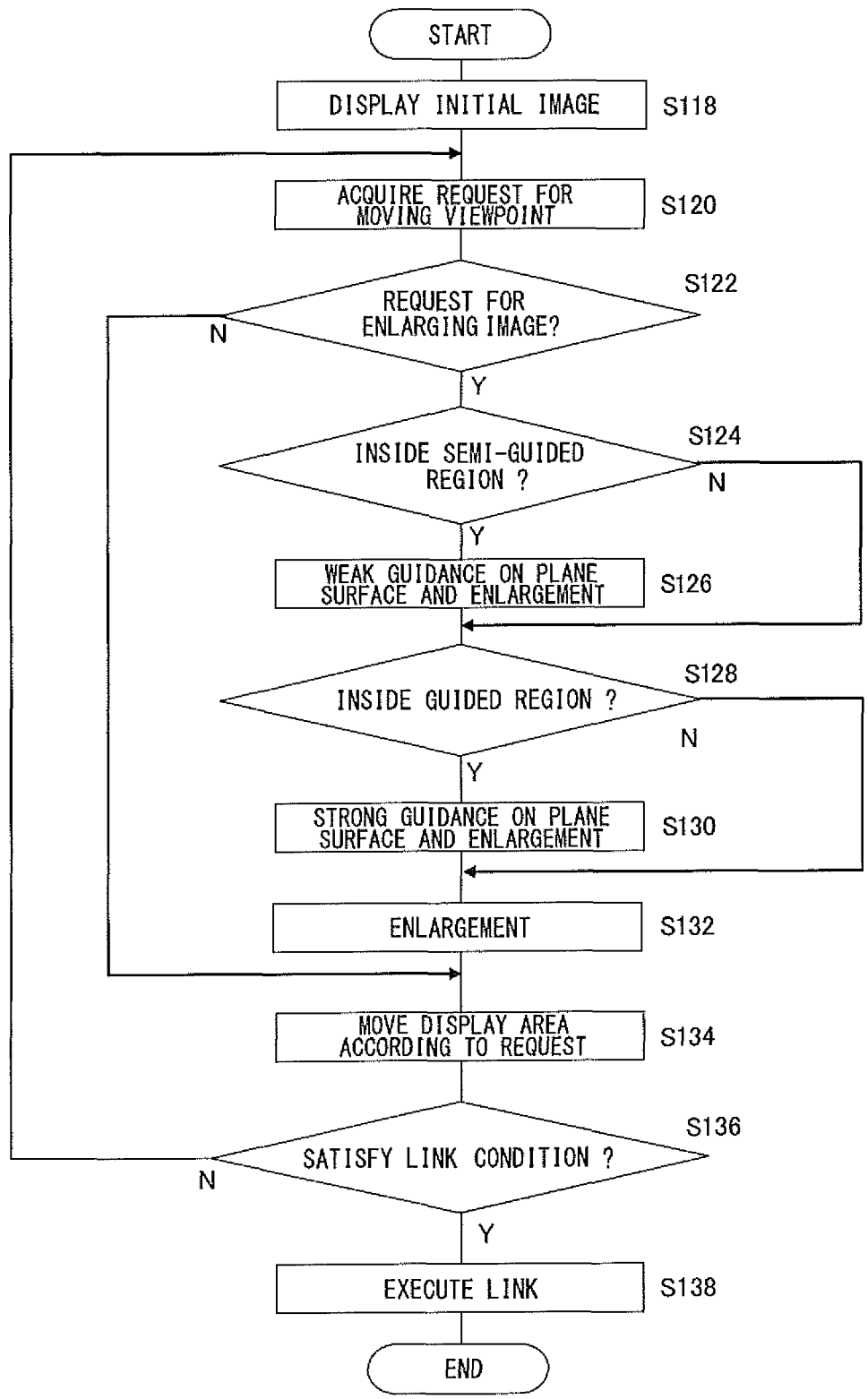
FIG. 26 is a flowchart showing the steps of the process relating to the guiding of the screen to the link area and execution of the link performed by the information processing device according to the second embodiment.

Next, an explanation will be given on the operation of the information processing device 10 configured as described above. FIG. 26 is a flowchart showing the steps of the process relating to the guidance of the screen to the link area and execution of the link performed by the information processing device 10. First, if the user request the activation of content to the information processing device 10, an initial image such as the display image 350 shown in FIG. 21 is displayed (S118). In this state, if a user requests to move the viewpoint while using the input device 20, the input information acquisition unit 102 acquires the information (S120). If the request for the move is a request for bringing the viewpoint close to the image plane, i.e., a request for enlarging the image (Y in S122), the guidance control unit 416 determines whether or not the viewpoint is within the semi-guided region (S124).

In case the viewpoint is within the semi-guided region (Y in S124), the guidance control unit 416 guides the screen by adding a movement in the horizontal planar direction to the movement in the direction of enlargement determined by the display area determining unit 104, based on the guidance force defined for the semi-guided region (S126). The guidance force in this process is weaker than that of the viewpoint within the guided region as described above. In case the viewpoint is not within the semi-guided region and within the guided region (N in S124, Y in S128), the screen is guided by adding a movement in the horizontal planar direction to the movement in the direction of enlargement in a similar manner as that of step S126. In this case, the guidance force is stronger than that of step S126 (S130). In the processes of step S126 and step S130, images are rendered by the decoding unit 106, the display image processing unit 114, or the like, in practice. The same thing is applied for processes of moving the display area in the description hereafter.

In case the viewpoint is not within the semi-guided region or the guided region (N in S124, N in S128), the movement of the screen in the direction of the enlargement determined by the display area determining unit 104 is adopted without change (S132). If the request to move the viewpoint acquired at step S120 is not only a request for enlargement (N in S122), the display area determining unit 104 moves the display area in accordance with the request to move the viewpoint (S134). By repeating the process of steps S120-S134 according to circumstances, the viewpoint gradually comes close to a certain link area. The link execution unit 418 monitors the result of the movement of the viewpoint until the condition for the link is satisfied (e.g., until the link area is displayed on the entire screen, etc.) (N in S136), at the time point when the condition is satisfied (Y in S136), the link execution unit 418 performs the process defined for the link area (S138).

According to the embodiment described above, in the information processing device that acknowledges the instruction for movement of the viewpoint including the enlargement/reduction of the display image and updates the display area, based on the positional relation between a specific area in the image and the area displayed on the screen, it is determined whether or not the user has an intention to zoom in to the area. If it is determined that the user has an intention to zoom in to the area, the guidance of the display area is executed. More specifically, in case the user requests to enlarge the image, the display area is enlarged and at the same time, the movement in the horizontal planar direction is added to the enlargement. This allows the user to skip some of the operations required for the user when zooming in to a desired area, and thus the burden of the user is reduced. Particularly, in a mode where the positioning the screen on a predefined area activates a process associated with that area, the process can be activated efficiently without requiring the user to finely adjust the display area.

During the guidance, in the period when the user requests to enlarge the image, an adjustment is made in the horizontal planar direction so as to correspond to the enlargement rate of the request for enlargement. That is, the amount of the adjustment is coupled with the strengths of the operation made by the user for the request of enlargement. Therefore, the guidance with a natural movement can be implemented without giving a feeling that the viewpoint moves on its own.

By defining more than two sorts of range of the viewpoint as the condition for the guidance, the guidance is performed in a stepwise manner. That is, at a stage where the discrepancy between the specific area and the screen is comparatively large, the possibility that the user intends to zoom in the specific area is determined to be not so high, and the guidance force is set small. When the discrepancy is small, the full-guidance is performed. This enables the guidance to be performed at a proper time and at a proper amount.

In addition, in case the viewpoint positions among a plurality of adjacent areas, the eventual amount of guidance is determined in accordance with the distance to respective areas. More specifically, the amount of guidance to respective areas is averaged while being weighted by distances. This enables the calculation of a proper guidance force even if the area towards which to be zoomed is in adjacent to another area. Therefore the embodiment can applied to images with various layout styles.

Described above is an explanation based on an exemplary embodiment. The embodiment is intended to be illustrative only and it will be obvious to those skilled in the art that various modifications to constituting elements and processes could be developed and that such modifications are also within the scope of the present invention.

For example, according to the embodiments, explanations are given on the movement of the display area in the virtual three-dimensional space that is formed by an image plane and a degree of resolution while associating the movement with the movement of the viewpoint relative to an image. However, also in case the display screen is defined as an area to be displayed of a two dimensional image plane, where the center position of the area and the size of the area are varied, the movement of the display screen can be construed as the movement of the virtual viewpoint of the user. That is, the embodiments of the present invention can also be applied to the movement of the display area of the two-dimensional plane, and a similar effect can be obtained.

DESCRIPTION OF THE REFERENCE NUMERALS

1 information processing system, 10 information processing device, 12 display device, 20 input device, 30 0-th layer, 32 first layer, 34 second layer, 36 third layer, 38 tile image, 44 display processing unit, 50 hard disk drive, 60 main memory, 70 buffer memory, 76 frame memory, 80 reference rectangle, 82 target rectangle, 84 bounding rectangle, 92 link boundary, 100 control unit, 102 input information acquisition unit, 103 loading unit, 104 display area determining unit, 106 decoding unit, 114 display image processing unit, 116 link determination unit, 117 object execution unit, 364 guided region, 366 semi-guided region, 408 breadcrumb list, 416 guidance control unit, 408 link execution unit.

As described above, the present invention is applicable to information processing devices such as computers, game devices, and image display devices, or the like.

The invention claimed is:

1. An information processing device comprising:
   a storage device configured to store hierarchical data that comprises image data of different resolutions that is hierarchized in order of resolution;
   an input information acquisition unit configured to acknowledge a user request for movement of a viewpoint in a virtual space which is defined by an image plane and a distance from the image plane;
   a display image processing unit configured to create a display image from the hierarchical data by changing an area to be displayed in response to the request to move the viewpoint; and
   an object execution unit configured to execute a process that is associated with a predetermined area of an image, when the viewpoint meets a condition for activating the process,
   wherein the condition is defined by the positional relationship between the predetermined area defined on the image plane and an area that is determined by the viewpoint and that is displayed on a screen,
   wherein at a plurality of viewpoint positions at which the display image includes the predetermined area, the predetermined area is displayed in emphasis indicating selection availability, and at other viewpoint positions at which the display image includes the predetermined area, the predetermined area is not displayed in the emphasis;
   wherein when the user request includes a selection of the predetermined area when the predetermined area is displayed in emphasis, the viewpoint is moved to the predetermined area such that the condition is met; and
   wherein the emphasis includes at least one of highlighting the predetermined area and changing one or more colors of the predetermined area.

2. The information processing device according to claim 1, wherein the condition requires that the ratio of a part of the area displayed on the screen, the part protruding from the predetermined area, is equal to or less than a predefined value.

3. The information processing device according to claim 1, wherein the condition requires that the ratio of a part of the predetermined area to the predetermined area, the part protruding from the area displayed on the screen, is equal to or less than a predefined value.

4. The information processing device according to claim 1, wherein when the viewpoint meets the condition defined in association with the predetermined area, the object execution unit reads from a memory at least one of either moving image data or audio data that is associated with the predetermined area, plays back the moving image data or audio data, and outputs the moving image data or audio data.

5. The information processing device according to claim 4, wherein
   when the viewpoint meets a first condition defined in association with the predetermined area, the object execution unit plays back one piece of frame data included in the moving image data and outputs the frame data, and
   when the viewpoint further meets a second condition defined in association with the predetermined area, the object execution unit outputs the moving image data that is played-back.

6. The information processing device according to claim 4, wherein
   when the viewpoint departs from the condition, the object execution unit suspends the playback of the data that have been being played back until that moment and stores a suspension point into the memory, and
   when the viewpoint meets the condition defined as being associated with the same predetermined area again, the object execution unit starts playing back the data from the suspension point and outputs the data.

7. The information processing device according to claim 6, wherein when a same moving image or same audio data is associated with a plurality of areas, the object execution unit stores into the memory a suspension point common for the plurality of areas.

8. The information processing device according to claim 1, wherein when the viewpoint meets a condition defined in association with the predetermined area, the object execution unit applies a display on the predetermined area, the display designating that a site on a network associated to the predetermined area is accessible.

9. An information processing method comprising:
   reading from a memory hierarchical data that comprises image data of different resolutions that is hierarchized in order of resolution and outputting the data to a display device;
   acknowledging a user request for movement of a viewpoint in a virtual space which is defined by an image plane and a distance from the image plane;
   changing an area to be displayed on the display device in response to the request to move the viewpoint; and
   executing a process defined as being associated with a predetermined area of an image, when the viewpoint meets a condition for activating the process,
   wherein the condition is defined by the positional relationship between the predetermined area defined on the image plane and an area that is determined by the viewpoint and that is displayed on a screen,
   wherein at a plurality of viewpoint positions at which the display image includes the predetermined area, the predetermined area is displayed in emphasis indicating selection availability, and at other viewpoint positions at which the display image includes the predetermined area, the predetermined area is not displayed in the emphasis;
   wherein when the user request includes a selection of the predetermined area when the predetermined area is displayed in emphasis, the viewpoint is moved to the predetermined area such that the condition is met; and
   wherein the emphasis includes at least one of highlighting the predetermined area and changing one or more colors of the predetermined area.

10. The information processing method according to claim 9, wherein the executing comprises:
    when the viewpoint meets a first condition defined as being associated with the predetermined area, playing back and outputting one piece of frame data, which is included in moving image data that is associated with the predetermined area; and
    when the viewpoint further meets a second condition defined as being associated with the predetermined area, outputting the moving image data that is played-back.

11. A computer program embedded in a non-transitory, computer-readable recording medium, comprising:
- a module configured to read from a memory hierarchical data that comprises image data of different resolutions that is hierarchized in order of resolution and configured to display the data on a display device;
- a module configured to acknowledge a user request for movement of a viewpoint in a virtual space which is defined by an image plane and a distance from the image plane;
- a module configured to change an area to be displayed on the display device in response to the request to move the viewpoint; and
- a module configured to execute a process defined as being associated with a predetermined area of an image, when the viewpoint meets a condition for activating the process,
- wherein the condition is defined by the positional relationship between the predetermined area defined on the image plane and an area that is determined by the viewpoint and that is displayed on a screen;
- wherein at a plurality of viewpoint positions at which the display image includes the predetermined area, the predetermined area is displayed in emphasis indicating selection availability, and at other viewpoint positions at which the display image includes the predetermined area, the predetermined area is not displayed in the emphasis;
- wherein when the user request includes a selection of the predetermined area when the predetermined area is displayed in emphasis, the viewpoint is moved to the predetermined area such that the condition is met; and
- wherein the emphasis includes at least one of highlighting the predetermined area and changing one or more colors of the predetermined area.

12. A non-transitory, computer-readable recording medium having embodied thereon a computer program, the computer program comprising:
- a module configured to read from a memory hierarchical data that comprises image data of different resolutions that is hierarchized in order of resolution and configured to display the data on a display device;
- a module configured to acknowledge a user request for movement of a viewpoint in a virtual space, the viewpoint being defined by both an image plane and a distance from the image plane;
- a module configured to change an area to be displayed on the display device in response to the request to move the viewpoint; and
- a module configured to execute a process defined as being associated with a predetermined area of an image, when the viewpoint meets a condition for activating the process,
- wherein the condition is defined by the positional relationship between the predetermined area defined on the image plane and an area that is determined by the viewpoint and that is displayed on a screen,
- wherein at a plurality of viewpoint positions at which the display image includes the predetermined area, the predetermined area is displayed in emphasis indicating selection availability, and at other viewpoint positions at which the display image includes the predetermined area, the predetermined area is not displayed in the emphasis;
- wherein when the user request includes a selection of the predetermined area when the predetermined area is displayed in emphasis, the viewpoint is moved to the predetermined area such that the condition is met; and
- wherein the emphasis includes at least one of highlighting the predetermined area and changing one or more colors of the predetermined area.

13. A non-transitory, computer-readable recording medium having recorded thereon a data structure for content adapted to associate data and a file with each other,
- wherein the data is hierarchical data that comprises image data of different resolutions that is hierarchized in order of resolution;
- wherein the file is a definition file configured to describe a condition for activating a process associated with a predetermined area in an image displayed while using the hierarchical data, the condition being defined by the positional relationship between the predetermined area defined on the plane of the image and an area of the image, the area being displayed on a screen and being determined by a viewpoint in a virtual space which is defined by the image plane and the distance from the image plane;
- wherein at a plurality of viewpoint positions at which the display image includes the predetermined area, the predetermined area is displayed in emphasis indicating selection availability, and at other viewpoint positions at which the display image includes the predetermined area, the predetermined area is not displayed in the emphasis;
- wherein when the user request includes a selection of the predetermined area when the predetermined area is displayed in emphasis, the viewpoint is moved to the predetermined area such that the condition is met; and
- wherein the emphasis includes at least one of highlighting the predetermined area and changing one or more colors of the predetermined area.

* * * * *